United States Patent
Yamada

(10) Patent No.: US 7,701,645 B2
(45) Date of Patent: Apr. 20, 2010

(54) ZOOM LENS SYSTEM, IMAGING DEVICE AND CAMERA

(75) Inventor: Katsu Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 337 days.

(21) Appl. No.: 11/884,261

(22) PCT Filed: Feb. 20, 2006

(86) PCT No.: PCT/JP2006/302942
§ 371 (c)(1),
(2), (4) Date: Aug. 14, 2007

(87) PCT Pub. No.: WO2006/090660
PCT Pub. Date: Aug. 31, 2006

(65) Prior Publication Data
US 2009/0128924 A1    May 21, 2009

(30) Foreign Application Priority Data
Feb. 22, 2005    (JP) ............................. 2005-045979

(51) Int. Cl.
*G02B 15/14* (2006.01)
(52) U.S. Cl. .................... 359/687; 359/774; 396/55
(58) Field of Classification Search ............... 359/687, 359/774; 396/55
See application file for complete search history.

(56) References Cited

U.S. PATENT DOCUMENTS

| 5,249,079 | A | 9/1993 | Umeda |
| 6,414,800 | B1 | 7/2002 | Hamano |
| 2003/0231388 | A1 | 12/2003 | Hamano et al. |
| 2005/0007480 | A1* | 1/2005 | Hamano et al. ............. 348/335 |

FOREIGN PATENT DOCUMENTS

| JP | 3-83006 | 4/1991 |
| JP | 2001-66500 | 3/2001 |
| JP | 2003-295059 | 10/2003 |
| JP | 2005-24844 | 1/2005 |

* cited by examiner

*Primary Examiner*—Joseph Martinez
(74) *Attorney, Agent, or Firm*—McDermott Will & Emery LLP

(57) ABSTRACT

An object is to provide a zoom lens system that can realize high image quality, a large aperture and a small size simultaneously and that can optically compensate blur of the image due to hand blur, vibration or the like, an imaging device and a camera. The present invention relates to a zoom lens system, in order from the object side to the image side, comprising a first lens unit having positive optical power, a second lens unit having negative optical power, a third lens unit having positive optical power and a fourth lens unit having positive optical power, wherein variable magnification is achieved by moving at least three lens units in an optical axis direction, focusing is achieved by moving the fourth lens unit in the optical axis direction, blur of the image is compensated by moving the third lens unit in a direction perpendicular to the optical axis, and at least one of a condition (1): $0<(|\Delta L|\cdot f_W)/(f_T\cdot IM)<10\times 10^{-2}$ and a condition (2): $0.005<(|\Delta L3|\cdot f_W)/(f_T\cdot IM)<0.15$ (here, $Z=f_T/f_W>8.0$) is satisfied, an imaging device and a camera.

10 Claims, 26 Drawing Sheets

ZOOM LENS SYSTEM, IMAGING DEVICE AND CAMERA

RELATED APPLICATIONS

This application is the U.S. National Phase under 35 U.S.C. §371 of International Application No. PCT/JP2006/302942, filed on Feb. 20, 2006, which in turn claims the benefit of Japanese Application No. 2005-045979, filed on Feb. 22, 2005, the disclosures of which Applications are incorporated by reference herein.

TECHNICAL FIELD

The present invention relates to a zoom lens system that employs a blur compensation function of optically compensating blur of an image due to hand blur, vibration or the like, as well as to an imaging device and a camera using the same.

BACKGROUND ART

In the prior art, in image shooting devices such as a digital video camera and a digital still camera, blur of the image at the time of image shooting is a problem. Thus, a function of preventing this is indispensable.

For example, an image shooting device described in Japanese Laid-Open Patent Publication No. 2001-66500 comprises a zoom lens system in which variable magnification is achieved by moving the first lens unit, the second lens unit and the fourth lens unit in the optical axis direction, and in which blur of the image due to hand blur is compensated by moving the third lens unit in a direction perpendicular to the optical axis.

Further, an image shooting device described in Japanese Laid-Open Patent Publication No. 2003-295059 comprises a zoom lens system in which variable magnification is achieved by moving the first lens unit, the second lens unit, the third lens unit and the fourth lens unit in the optical axis direction, and in which blur of the image due to hand blur is compensated by moving the third lens unit in a direction perpendicular to the optical axis.

[Patent Document 1] Japanese Laid-Open Patent Publication No. 2001-66500
[Patent Document 2] Japanese Laid-Open Patent Publication No. 2003-295059

DISCLOSURE OF THE INVENTION

Problems to be Solved by the Invention

In the image shooting device described in Japanese Laid-Open Patent Publication No. 2001-66500, blur of the image can be compensated to some extent. Nevertheless, high image quality, a large aperture and a small size which are highly demanded in recent years cannot be realized simultaneously. Further, the zoom lens system employed in this image shooting device has a variable magnification ratio of merely 8 or the like, which is insufficient.

Further, also in the image shooting device described in Japanese Laid-Open Patent Publication No. 2003-295059, blur of the image can be compensated to some extent. Nevertheless, since variable magnification is achieved by moving all the lens units in the optical axis direction, a large change arises in the overall optical length. Further, since a large number of lenses are used in the configuration of the zoom lens system, its size reduction is difficult.

The present invention has been made in order to resolve the problems described in the prior art. Objects of the present invention are to provide: a zoom lens system that can realize high image quality, a large aperture and a small size simultaneously and that can optically compensate blur of the image due to hand blur, vibration or the like; and an imaging device and a camera using the same.

Solution to the Problems

One of the above-mentioned objects is achieved by a zoom lens system described below. That is, the present invention relates to a zoom lens system that, in order from the object side to the image side, comprises:
a first lens unit having positive optical power;
a second lens unit having negative optical power;
a third lens unit having positive optical power; and
a fourth lens unit having positive optical power, wherein
variable magnification is achieved by moving at least three lens units in an optical axis direction,
focusing is achieved by moving the fourth lens unit in the optical axis direction,
blur of the image is compensated by moving the third lens unit in a direction perpendicular to the optical axis, and
at least one of the following conditions (1) and (2) is satisfied:

$$0 < (|\Delta L| \cdot f_W)/(f_T \cdot IM) < 10 \times 10^{-2} \quad (1)$$

$$0.005 < (|\Delta L3| \cdot f_W)/(f_T \cdot IM) < 0.15 \quad (2)$$

(here, $Z = f_T/f_W > 8.0$)
where,
$\Delta L$ is an amount of change in the overall optical length,
$\Delta L3$ is a difference between an interval from an image surface to a most object side surface of the third lens unit at a wide-angle limit and an interval from the image surface to the most object side surface of the third lens unit at a telephoto limit,
IM is an image size,
$f_W$ is a focal length of the entire system at a wide-angle limit, and
$f_T$ is a focal length of the entire system at a telephoto limit.

Further, one of the above-mentioned objects is achieved by an imaging device described below. That is, the present invention relates to an imaging device capable of converting an optical image of a photographic object into an electric image signal and then outputting the signal, the imaging device comprising:
a zoom lens system that forms with a variable magnification the optical image of the photographic object; and
an image sensor that converts the optical image formed by the zoom lens system into the electric image signal, wherein
the zoom lens system, in order from the object side to the image side, comprises:
a first lens unit having positive optical power;
a second lens unit having negative optical power;
a third lens unit having positive optical power; and
a fourth lens unit having positive optical power, and wherein
variable magnification is achieved by moving at least three lens units in an optical axis direction,
focusing is achieved by moving the fourth lens unit in the optical axis direction,
blur of the image is compensated by moving the third lens unit in a direction perpendicular to the optical axis, and at least one of the following conditions (1) and (2) is satisfied:

$$0 < (|\Delta L| \cdot f_W)/(f_T \cdot IM) < 10 \times 10^{-2} \quad (1)$$

$$0.005 < (|\Delta L3| \cdot f_W)/(f_T \cdot IM) < 0.15 \quad (2)$$

(here, $Z = f_T/f_W > 8.0$)
where, $\Delta L$ is an amount of change in the overall optical length, $\Delta L3$ is a difference between an interval from an image surface to a most object side surface of the third lens unit at a wide-angle limit and an interval from the image surface to the most object side surface of the third lens unit at a telephoto limit, IM is an image size, $f_W$ is a focal length of the entire system at a wide-angle limit, and $f_T$ is a focal length of the entire system at a telephoto limit.

Further, one of the above-mentioned objects is achieved by a camera described below. That is, the present invention relates to a camera capable of shooting a photographic object and then outputting its image as an electric image signal, the camera comprising:

an imaging device having a zoom lens system that forms with a variable magnification the optical image of the photographic object and an image sensor that converts the optical image of the photographic object formed by the zoom lens system into the electric image signal, wherein the zoom lens system, in order from the object side to the image side, comprises:

a first lens unit having positive optical power;

a second lens unit having negative optical power;

a third lens unit having positive optical power; and a fourth lens unit having positive optical power, and wherein variable magnification is achieved by moving at least three lens units in an optical axis direction, focusing is achieved by moving the fourth lens unit in the optical axis direction, blur of the image is compensated by moving the third lens unit in a direction perpendicular to the optical axis, and at least one of the following conditions (1) and (2) is satisfied:

$$0 < (|\Delta L| \cdot f_W)/(f_T \cdot IM) < 10 \times 10^{-2} \quad (1)$$

$$0.005 < (|\Delta L3| \cdot f_W)/(f_T \cdot IM) < 0.15 \quad (2)$$

(here, $Z = f_T/f_W > 8.0$)
where, $\Delta L$ is an amount of change in the overall optical length, $\Delta L3$ is a difference between an interval from an image surface to a most object side surface of the third lens unit at a wide-angle limit and an interval from the image surface to the most object side surface of the third lens unit at a telephoto limit, IM is an image size, $f_W$ is a focal length of the entire system at a wide-angle limit, and $f_T$ is a focal length of the entire system at a telephoto limit.

EFFECT OF THE INVENTION

According to the present invention, a zoom lens system can be provided that realizes high image quality, a large aperture and a small size simultaneously and that employs a blur compensation function of optically compensating blur of an image due to hand blur, vibration or the like.

Further, according to the present invention, when the above-mentioned zoom lens system is employed, small and high-performance imaging device and camera can be provided in which blur of the image can optically be compensated.

Figure 1:
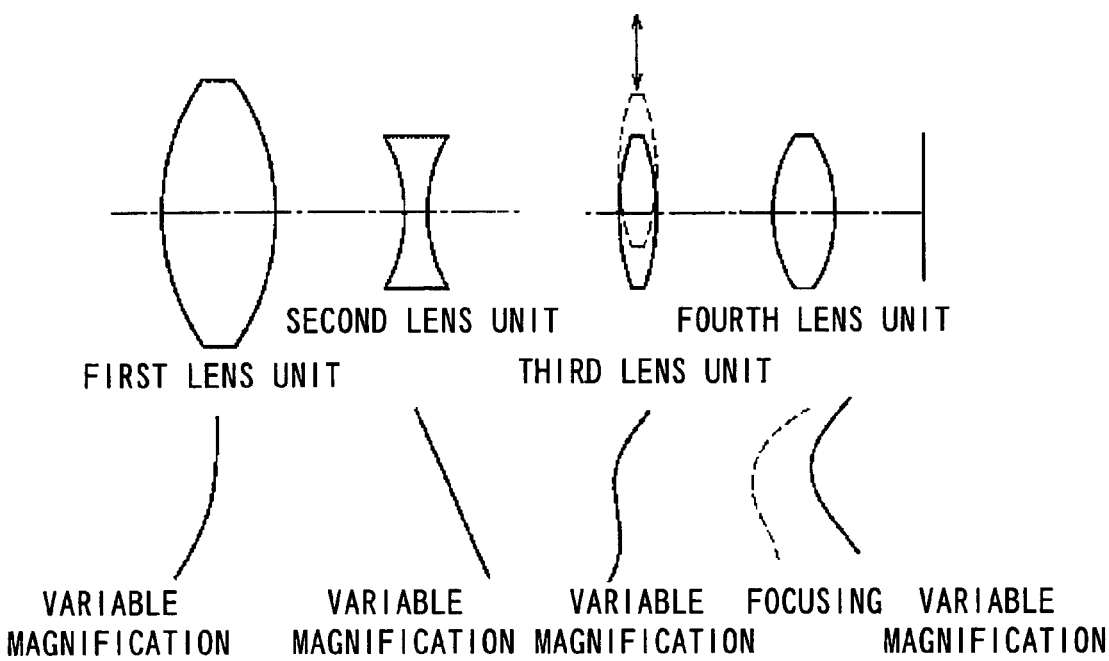
FIG. 1 is a schematic explanation diagram showing a basic configuration of a zoom lens system according to Embodiments 1 to 5.

DESCRIPTION OF THE REFERENCE CHARACTERS 341 zoom lens
342 low pass filter
343 image sensor
344 signal processing circuit
345 viewfinder
346 drive unit
347 detector
351 zoom lens system
352 retraction type lens barrel
353 optical viewfinder
354 shutter
G1 first lens unit
G2 second lens unit
G3 third lens unit
G4 fourth lens unit
L1 first lens element
L2 second lens element
L3 third lens element
L4 fourth lens element
L5 fifth lens element
L6 sixth lens element
L7 seventh lens element
L8 eighth lens element
L9 ninth lens element
L10 tenth lens element
L11 eleventh lens element
L12 twelfth lens element
L13 thirteenth lens element
A diaphragm
P plane parallel plate
S image surface

BEST MODE FOR CARRYING OUT THE INVENTION

Embodiments 1 to 5

FIG. 1 is a schematic explanation diagram showing a basic configuration of a zoom lens system according to Embodiments 1 to 5. As shown in FIG. 1, the zoom lens system is a zoom lens system of four-unit construction, in order from the object side to the image side, comprising a first lens unit, a second lens unit, a third lens unit and a fourth lens unit. In the zoom lens system, variable magnification (zooming) is achieved by moving the first lens unit, the second lens unit, the third lens unit and the fourth lens unit in the optical axis direction, while focusing is achieved further by moving the fourth lens unit in the optical axis direction. Further, blur of the image due to hand blur, vibration or the like is optically compensated by moving the third lens unit in a direction perpendicular to the optical axis.

First, Embodiments 1 to 4 are described below in detail.

The zoom lens system according to Embodiments 1 to 4, in order from the object side to the image side, comprises a first lens unit having positive optical power, a second lens unit having negative optical power, a diaphragm, a third lens unit having positive optical power, and a fourth lens unit having positive optical power.

In the zoom lens system according to Embodiments 1 to 4, variable magnification is achieved by moving all the lens units in the optical axis direction, while focusing is achieved by moving the fourth lens unit in the optical axis direction, and while the blur of the image is compensated by moving the third lens unit in a direction perpendicular to the optical axis.

In particular, in magnification variation from a wide-angle limit to a telephoto limit, the first lens unit moves to the object side. In such a configuration that the first lens unit moves to the object side, the entrance pupil is located on the object side in a wide-angle range where the view angle is large. Thus, the height of the light beam that passes the first lens unit can be reduced. Accordingly, distortion, astigmatism and magnification chromatic aberration can be suppressed further.

Further, in magnification variation from a wide-angle limit to a telephoto limit, the third lens unit is located on the most image side at a wide-angle limit. In the present Embodiments 1 to 4, in magnification variation from a wide-angle limit to a telephoto limit, the interval between the second lens unit having negative optical power and the third lens unit having positive optical power becomes small. Thus, in order that size reduction should be achieved in the zoom lens system and that a high variable magnification ratio should still be ensured, it is preferable that the third lens unit is arranged on the most image side at a wide-angle limit and drawn out to the object side at the time of variable magnification.

As described above, the zoom lens system according to Embodiments 1 to 4 has a configuration that variable magnification is achieved by moving all the lens units in the optical axis direction. However, the present invention is not limited to this configuration. The configuration may be such that variable magnification is achieved by moving at least three lens units in the optical axis direction.

Further, the zoom lens system according to Embodiments 1 to 4 has a configuration that in magnification variation from a wide-angle limit to a telephoto limit, the first lens unit moves to the object side while the third lens unit is located on the most image side at a wide-angle limit. However, the present invention is not limited to this configuration.

Figure 2:
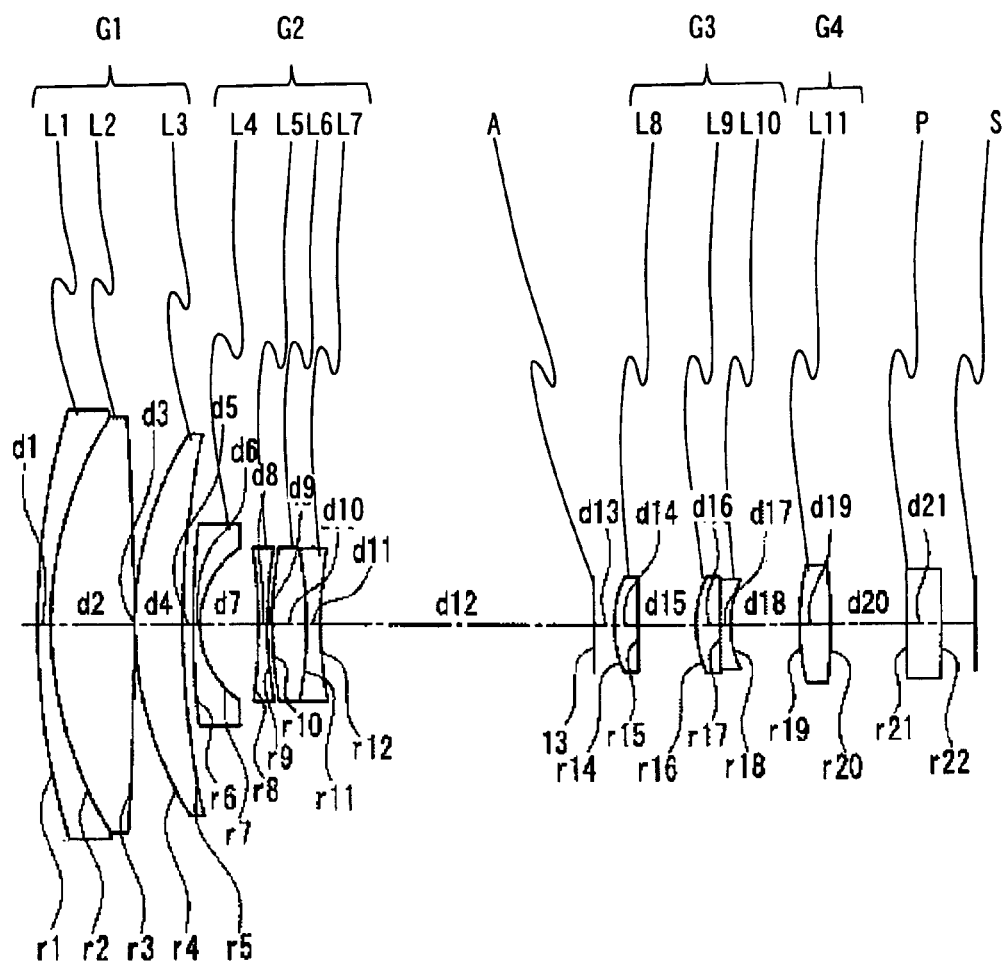
FIG. 2 is a schematic configuration diagram of a zoom lens system according to Embodiments 1 to 4.

FIG. 2 is a schematic configuration diagram of a zoom lens system according to Embodiments 1 to 4. As shown in FIG. 2, the first lens unit G1 comprises lens elements L1 to L3. The second lens unit G2 comprises lens elements L4 to L7. The third lens unit G3 comprises lens elements L8 to L10. The fourth lens unit G4 comprises a lens element L11.

In the zoom lens system according to Embodiments 1 to 4, the diaphragm A is arranged between the lens element L7 of the second lens unit G2 and the lens element L8 of the third lens unit G3. The straight line drawn on the rightmost side in FIG. 2 indicates the position of an image surface S. On its object side, a plane parallel plate P is provided that is equivalent to an optical low pass filter, an infrared cut-off filter, or a face plate of an image sensor such as a CCD (Charge Coupled Device) or a CMOS (Complementary Metal-Oxide Semiconductor).

In the zoom lens system according to Embodiments 1 to 4, the first lens unit G1, in order from the object side to the image side, comprises: a negative meniscus first lens element L1 with the convex surface facing the object side; a bi-convex second lens element L2 (Embodiments 1 to 2) or a planer-convex second lens element L2 (Embodiments 3 to 4) with the convex surface facing the object side; and a positive meniscus third lens element L3 with the convex surface facing the object side. Among these, the first lens element L1 and the second lens element L2 are cemented with each other.

In the zoom lens system according to Embodiments 1 to 4, the second lens unit G2, in order from the object side to the image side, comprises: a negative meniscus fourth lens element L4 with the convex surface facing the object side; a bi-concave fifth lens element L5; a bi-convex sixth lens element L6; and a bi-concave seventh lens element L7. Among these, the sixth lens element L6 and the seventh lens element L7 are cemented with each other. Further, the image side surface r12 of the seventh lens element L7 is aspherical.

In the zoom lens system according to Embodiments 1 to 4, the third lens unit G3, in order from the object side to the image side, comprises: a positive meniscus eighth lens element L8 with the convex surface facing the object side; a bi-convex ninth lens element L9; and a bi-concave tenth lens element L10. Among these, the ninth lens element L9 and the tenth lens element L10 are cemented with each other. Further, the object side surface r16 of the ninth lens element L9 is aspherical.

Further, in the zoom lens system according to Embodiments 1 to 4, the fourth lens unit G4 comprises solely a bi-convex eleventh lens element L11. Further, the object side surface r19 of the eleventh lens element L11 is aspherical.

In the zoom lens system according to Embodiments 1 to 4, the third lens unit G3, in order from the object side to the image side, comprises a positive lens element and a cemented lens element that is composed of a positive lens element and a negative lens element. The configuration that the third lens unit G3, in order from the object side to the image side, comprises a positive lens element, a positive lens element and a negative lens element is preferable to the configuration that the negative lens element is arranged on the object side relative to the positive lens elements, in the point that the lens diameter can be reduced. Here, the positive lens element and the negative lens element need not necessarily be cemented with each other. Further, the third lens unit G3 may, in order from the object side to the image side, comprise a positive lens element, a negative lens element and a positive lens element.

Further, in the zoom lens system according to the present Embodiments 1 to 4, the fourth lens unit G4 comprises a single positive lens element. However, the present invention is not limited to this configuration.

Next, Embodiment 5 is described below in detail.

The zoom lens system according to Embodiment 5, in order from the object side to the image side, comprises a first lens unit having positive optical power, a second lens unit having negative optical power, a diaphragm, a third lens unit having positive optical power, and a fourth lens unit having positive optical power.

In the zoom lens system according to Embodiment 5, variable magnification is achieved by moving all the lens units in the optical axis direction, while focusing is achieved by moving the fourth lens unit in the optical axis direction, and while the blur of the image is compensated by moving the third lens unit in a direction perpendicular to the optical axis.

In particular, in magnification variation from a wide-angle limit to a telephoto limit, the first lens unit moves to the object side. In such a configuration that the first lens unit moves to the object side, the entrance pupil is located on the object side in a wide-angle range where the view angle is large. Thus, the height of the light beam that passes the first lens unit can be reduced. Accordingly, distortion, astigmatism and magnification chromatic aberration can be suppressed further.

Further, in magnification variation from a wide-angle limit to a telephoto limit, the third lens unit is located on the most image side at a wide-angle limit. In the present Embodiment 5, in magnification variation from a wide-angle limit to a telephoto limit, the interval between the second lens unit having negative optical power and the third lens unit having positive optical power becomes small. Thus, in order that size reduction should be achieved in the zoom lens system and that a high variable magnification ratio should still be ensured, it is preferable that the third lens unit is arranged on the most image side at a wide-angle limit and drawn out to the object side at the time of variable magnification.

As described above, the zoom lens system according to Embodiment 5 has a configuration that variable magnification is achieved by moving all the lens units in the optical axis direction. However, the present invention is not limited to this configuration. The configuration may be such that variable magnification is achieved by moving at least three lens units in the optical axis direction.

Further, the zoom lens system according to Embodiment 5 has a configuration that in magnification variation from a wide-angle limit to a telephoto limit, the first lens unit moves to the object side while the third lens unit is located on the most image side at a wide-angle limit. However, the present invention is not limited to this configuration.

Figure 19:
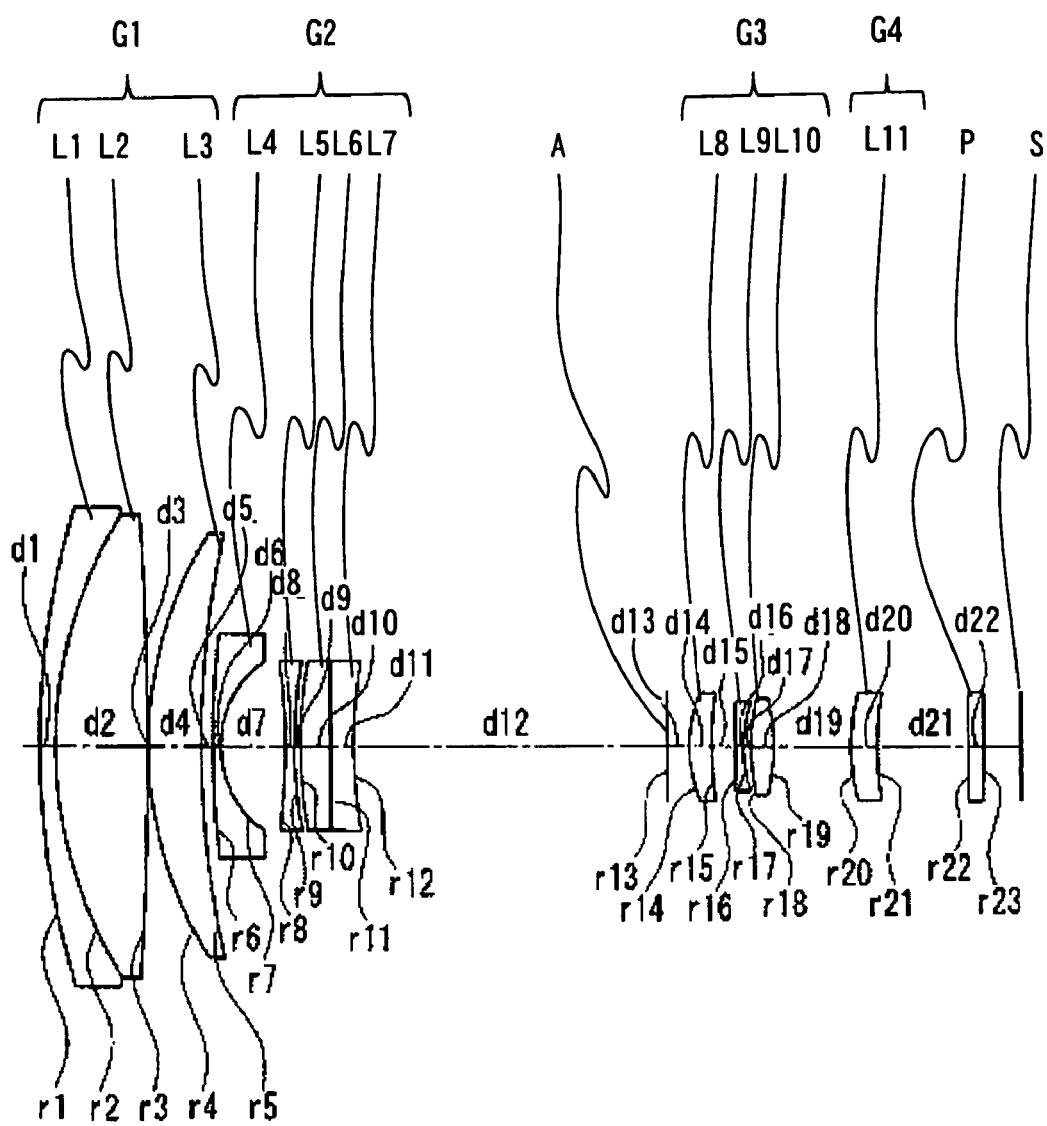
FIG. 19 is a schematic configuration diagram of a zoom lens system according to Embodiment 5.

FIG. 19 is a schematic configuration diagram of a zoom lens system according to Embodiment 5. As shown in FIG. 19, the first lens unit G1 comprises lens elements L1 to L3. The second lens unit G2 comprises lens elements L4 to L7. The third lens unit G3 comprises lens elements L8 to L10. The fourth lens unit G4 comprises a lens element L11.

In the zoom lens system according to Embodiment 5, the diaphragm A is arranged between the lens element L7 of the second lens unit G2 and the lens element L8 of the third lens unit G3. Further, a straight line drawn on the rightmost side in FIG. 19 indicates the position of the image surface S. On its object side, a plane parallel plate P is provided similarly to Embodiments 1 to 4.

In the zoom lens system according to Embodiment 5, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

Further, in the zoom lens system according to Embodiment 5, the second lens unit G2, in order from the object side to the image side, comprises: a negative meniscus fourth lens element L4 with the convex surface facing the object side; a bi-concave fifth lens element L5; a planer-convex sixth lens element L6 with the convex surface facing the object side and a planer-concave seventh lens element L7 with the concave surface facing the image side. Among these, the sixth lens element L6 and the seventh lens element L7 are cemented with each other. Further, the image side surface r12 of the seventh lens element L7 is aspherical.

Further, in the zoom lens system according to Embodiment 5, the third lens unit G3, in order from the object side to the image side, comprises: a positive meniscus eighth lens element L8 with the convex surface facing the object side; a bi-concave ninth lens element L9; and a bi-convex tenth lens element L10. Among these, the object side surface r16 of the ninth lens element L9 is aspherical.

Further, in the zoom lens system according to Embodiment 5, the fourth lens unit G4 comprises solely a positive meniscus eleventh lens element L11 with the convex surface facing the object side. The object side surface r20 of the eleventh lens element L11 is aspherical.

In the zoom lens system according to the present Embodiment 5, the third lens unit G3, in order from the object side to the image side, comprises a positive lens element, a negative lens element and a positive lens element. This configuration is preferable in the point that reflected light from the most image side surface of the third lens unit G3 is not incident on the imaging surface, and hence occurrence of ghosts and flares is suppressed. However, the present invention is not limited to this configuration.

Further, in the zoom lens system according to the present Embodiment 5, the fourth lens unit G4 comprises a single positive lens element. However, the present invention is not limited to this configuration.

Embodiments 6 to 7

Figure 24:
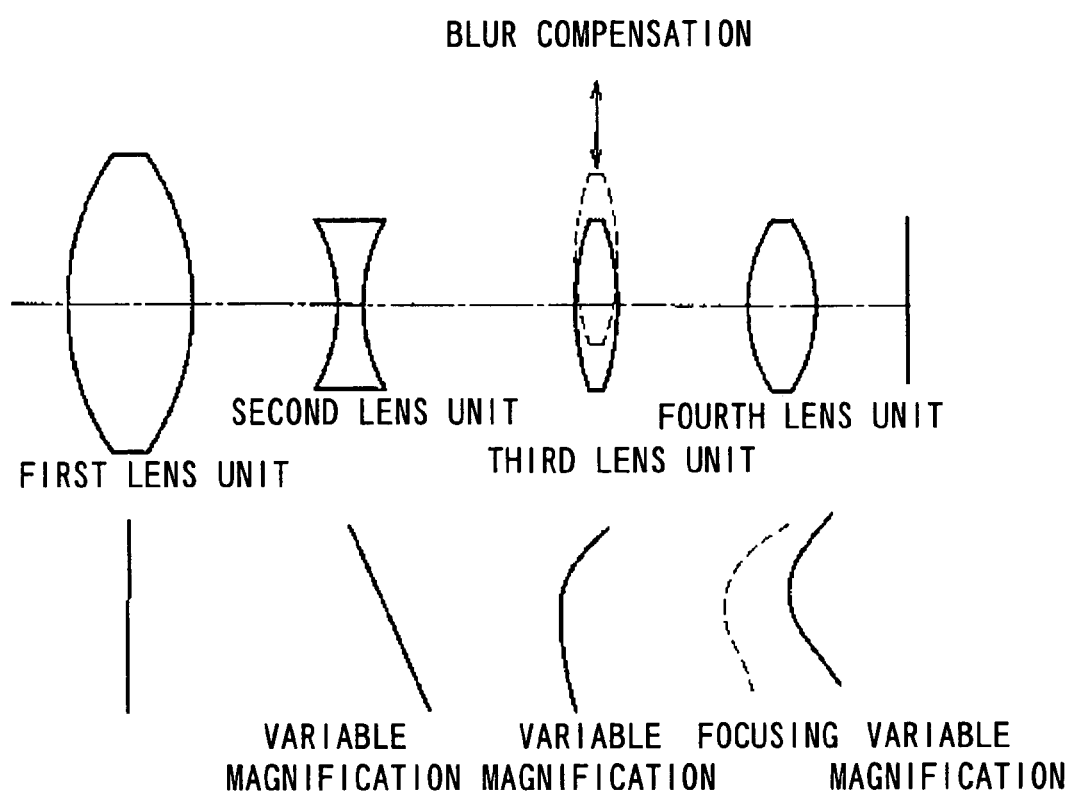
FIG. 24 is a schematic explanation diagram showing a basic configuration of a zoom lens system according to Embodiments 6 to 7.

FIG. 24 is a schematic explanation diagram showing a basic configuration of a zoom lens system according to Embodiments 6 to 7. As shown in FIG. 24, the zoom lens system is a zoom lens system of four-unit construction, in order from the object side to the image side, comprising a first lens unit having positive optical power, a second lens unit having negative optical power, a third lens unit having positive optical power and a fourth lens unit having positive optical power. In the zoom lens system, variable magnification (zooming) is achieved by moving the second lens unit, the third lens unit and the fourth lens unit in the optical axis direction, while focusing is achieved further by moving the fourth lens unit in the optical axis direction. Further, blur of the image due to hand blur, vibration or the like is optically compensated by moving the third lens unit in a direction perpendicular to the optical axis.

In particular, in magnification variation from a wide-angle limit to a telephoto limit, the third lens unit is located on the most image side at a wide-angle limit. In the present Embodiments 6 to 7, in magnification variation from a wide-angle limit to a telephoto limit, the interval between the second lens unit having negative optical power and the third lens unit having positive optical power becomes small. Thus, in order that size reduction should be achieved in the zoom lens system and that a high variable magnification ratio should still be ensured, it is preferable that the third lens unit is arranged on the most image side at a wide-angle limit and drawn out to the object side at the time of variable magnification.

As such, the zoom lens system according to Embodiments 6 to 7 has a configuration that in magnification variation from a wide-angle limit to a telephoto limit, the third lens unit is located on the most image side at a wide-angle limit. However, the present invention is not limited to this configuration.

Figure 25:
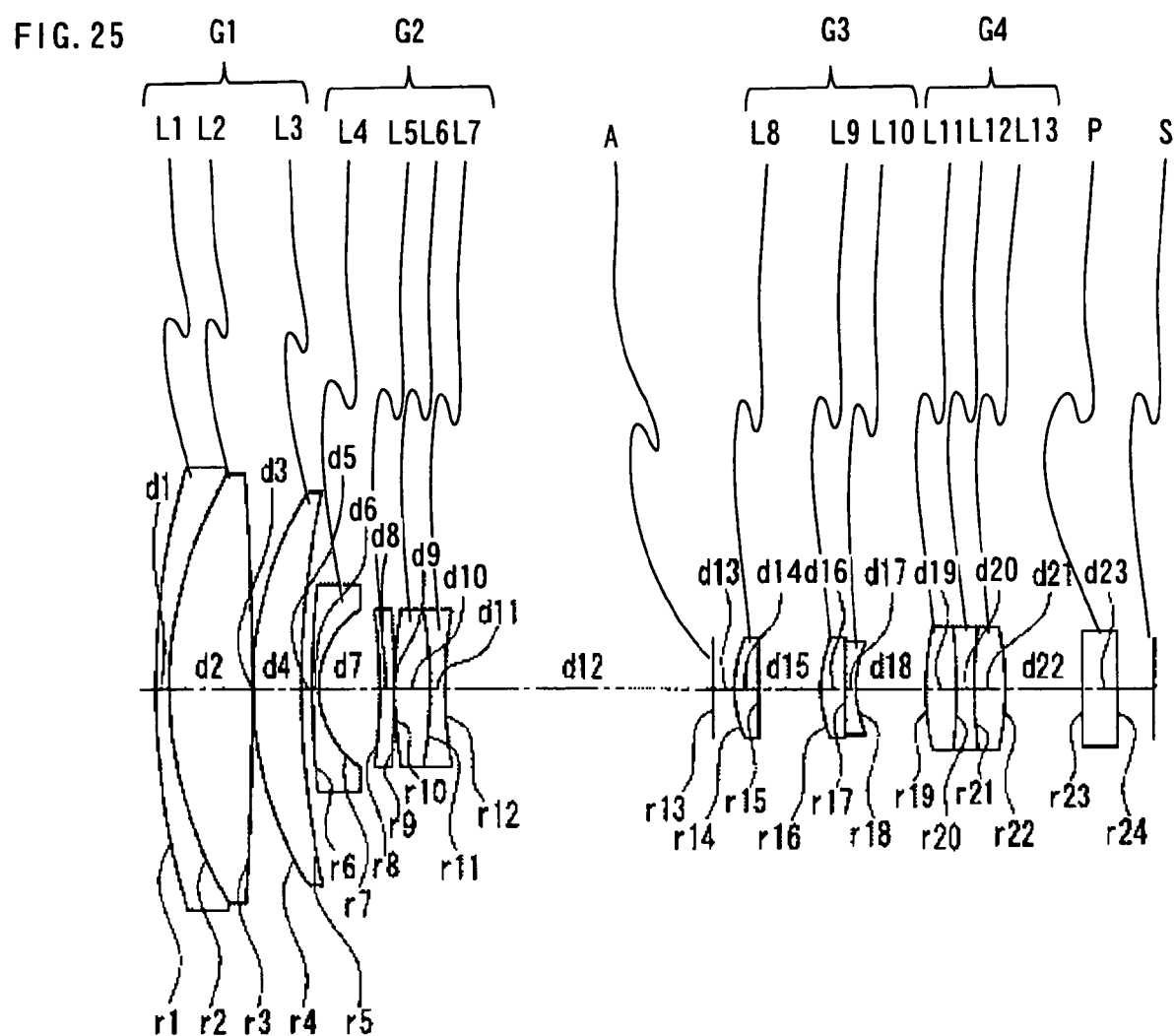
FIG. 25 is a schematic configuration diagram of a zoom lens system according to Embodiments 6 to 7.

FIG. 25 is a schematic configuration diagram of a zoom lens system according to Embodiments 6 to 7. As shown in FIG. 25, the first lens unit G1 comprises lens elements L1 to L3. The second lens unit G2 comprises lens elements L4 to L7. The third lens unit G3 comprises lens elements L8 to L10. The fourth lens unit G4 comprises lens elements L11 to L13.

In the zoom lens system according to Embodiments 6 to 7, the diaphragm A is arranged between the lens element L7 of the second lens unit G2 and the lens element L8 of the third lens unit G3. Further, a straight line drawn on the rightmost side in FIG. 25 indicates the position of the image surface S. On its object side, a plane parallel plate P is provided similarly to Embodiments 1 to 5.

In the zoom lens system according to Embodiments 6 to 7, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

Further, in the zoom lens system according to Embodiments 6 to 7, the second lens unit G2, in order from the object side to the image side, comprises: a negative meniscus fourth lens element L4 with the convex surface facing the object side; a negative meniscus fifth lens element L5 (Embodiment 6) with the convex surface facing the image side or a biconcave fifth lens element L5 (Embodiment 7); a bi-convex sixth lens element L6; and a bi-concave seventh lens element L7. Among these, the sixth lens element L6 and the seventh lens element L7 are cemented with each other. Further, the image side surface r12 of the seventh lens element L7 is aspherical.

In the zoom lens system according to Embodiments 6 to 7, the third lens unit G3, in order from the object side to the image side, comprises: a positive meniscus eighth lens element L8 with the convex surface facing the object side; a bi-convex ninth lens element L9; and a bi-concave tenth lens element L10. Among these, the ninth lens element L9 and the tenth lens element L10 are cemented with each other. Further, the object side surface r16 of the ninth lens element L9 is aspherical.

Further, in the zoom lens system according to Embodiments 6 to 7, the fourth lens unit G4, in order from the object side to the image side, comprises: a bi-convex eleventh lens element L11; a bi-concave twelfth lens element L12; and a bi-convex thirteenth lens element L13. The eleventh lens element L11, the twelfth lens element L12 and the thirteenth lens element L13 are cemented with each other. Further, the image side surface r22 of the thirteenth lens element L13 is aspherical.

In the zoom lens system according to Embodiments 6 to 7, the third lens unit G3, in order from the object side to the image side, comprises a positive lens element and a cemented lens element that is composed of a positive lens element and a negative lens element. The configuration that the third lens unit G3, in order from the object side to the image side, comprises a positive lens element, a positive lens element and a negative lens element is preferable to the configuration that the negative lens element is arranged on the object side relative to the positive lens elements, in the point that the lens diameter can be reduced. Here, the positive lens element and the negative lens element need not necessarily be cemented to each other. Further, the third lens unit G3 may, in order from the object side to the image side, comprise a positive lens element, a negative lens element and a positive lens element.

Further, in the zoom lens system according to the present Embodiments 6 to 7, the fourth lens unit G4 is composed of a cemented lens element, in order from the object side to the image side, comprising a positive lens element, a negative lens element and a positive lens element. However, the present invention is not limited to this configuration.

Hereinafter, conditions are described below that are preferred to be satisfied by a zoom lens system, like the zoom lens system according to Embodiments 1 to 7, that, in order from the object side to the image side, comprises a first lens unit having positive optical power, a second lens unit having negative optical power, a third lens unit having positive optical power and a fourth lens unit having positive optical power, wherein variable magnification is achieved by moving at least three lens units in the optical axis direction, focusing is achieved by moving the fourth lens unit in the optical axis direction, and blur of the image is compensated by moving the third lens unit in a direction perpendicular to the optical axis. Here, a plurality of preferable conditions are set forth for the zoom lens system according to each embodiment. The configuration that satisfies all the conditions is most desirable for the zoom lens system. However, when an individual condition is satisfied, a zoom lens system providing the corresponding effect can be obtained.

For example, a zoom lens system like the zoom lens system according to Embodiments 1 to 7 satisfies at least one of the following conditions (1) and (2):

$$0 < (|\Delta L| \cdot f_W)/(f_T \cdot IM) < 10 \times 10^{-2} \quad (1)$$

$$0.005 < (|\Delta L3| \cdot f_W)/(f_T \cdot IM) < 0.15 \quad (2)$$

(here, $Z = f_T/f_W > 8.0$)

where, $\Delta L$ is an amount of change in the overall optical length, $\Delta L3$ is a difference between an interval from an image surface to a most object side surface of the third lens unit at a wide-angle limit and an interval from the image surface to the most object side surface of the third lens unit at a telephoto limit, IM is an image size, $f_W$ is a focal length of the entire system at a wide-angle limit, and $f_T$ is a focal length of the entire system at a telephoto limit.

The condition (1) is a condition concerning the movement and the performance of the first lens unit. When the value goes below the lower limit of the condition (1), the variation in the magnification achieved by the first lens unit becomes excessively small. Thus, in order that size reduction should be achieved in the zoom lens system, the optical power of, especially, the second lens unit need be increased. This causes aberration such as curvature of field. On the other hand, when the value exceeds the upper limit of the condition (1), the change in the height of the light beam that passes the first lens unit becomes large. This causes a large change, especially, in astigmatism associated with magnification variation. When the condition (1) is satisfied, size reduction in the zoom lens system is realized in a state that fluctuation in the aberration is suppressed.

Here, the image size IM defined in the present specification is calculated according to the following formula.

$$IM = 2f_W \times \tan \omega$$

where, $f_W$ is a focal length of the entire system at a wide-angle limit, and $\omega$ is an incident half view angle.

Further, when at least one of the following conditions (1)' and (1)" is satisfied, the above effect is achieved more successfully.

$$2.0 \times 10^{-2} < (|\Delta L| \cdot f_W)/(f_T \cdot IM) \quad (1)'$$

$$(|\Delta L| \cdot f_W)/(f_T \cdot IM) < 9.5 \times 10^{-2} \quad (1)''$$

(here, $Z = f_T/f_W > 8.0$)

The condition (2) is a condition concerning the movement, the size and the performance of the third lens unit. When the value goes below the lower limit of the condition (2), the solid angle of the axial light beam becomes large. Thus, although the F-number can be reduced, the distance between the first lens unit and the diaphragm becomes long. This causes an increase in the distance of the entrance pupil. Thus, the height of the light beam that passes the first lens unit becomes high. This prevents size reduction in the zoom lens system, and further increases astigmatism and distortion. On the other hand, when the value exceeds the upper limit of the condition (2), the height of the light beam that passes the third lens unit becomes low. This is advantageous in size reduction in the zoom lens system, but the solid angle of the axial light beam becomes small, and hence diffraction causes difficulty in achieving high image quality. Further, in order that the aperture should be enlarged, the effective diameter of the third lens unit need be increased. This causes an increase in spherical aberration and in the weight of the lens, and hence an increase in the load of the actuator at the time of blur compensation. When the condition (2) is satisfied, in a state that size reduction in the zoom lens system is achieved, the F-number can be adjusted to 4 or the like. Thus, degradation in the image caused by diffraction can be avoided.

Here, for example, when the F-number is 5.6, the MTF (Modulation Transfer Function: degree of resolution) of an ideal lens to the C-line becomes less than 10% for the case of 220 lines/mm. However, when the F-number is 4.0, the MTF of an ideal lens to the C-line becomes 10% or greater for the case up to 300 lines/mm.

Further, when at least one of the following conditions (2)' and (2)" is satisfied, the above effect is achieved more successfully.

$$0.008 < (|\Delta L3| \cdot f_W)/(f_T \cdot IM) \quad (2)'$$

$$(|\Delta L3| \cdot f_W)/(f_T \cdot IM) < 0.12 \quad (2)''$$

(here, $Z = f_T/f_W > 8.0$)

Further, for example, in a zoom lens system like the zoom lens system according to Embodiments 1 to 7, it is preferable that the following condition (3) is satisfied.

$$-1.0 < (\phi 1 + \phi 2 + \phi 3 \cdot \phi 4)/IM < 3.5 \times 10^{-3} \quad (3)$$

(here, $Z = f_T/f_W > 8.0$)

where, $\phi 1$ is optical power of the first lens unit, $\phi 2$ is optical power of the second lens unit, $\phi 3$ is optical power of the third lens unit, $\phi 4$ is optical power of the fourth lens unit, and IM is an image size.

The condition (3) is a condition concerning the total of the optical power of three lens units having positive optical power and the optical power of one lens unit having negative optical power. When the value becomes negative, the optical power of the second lens unit becomes large. When the value goes below the lower limit of the condition (3), the negative optical power of the second lens unit becomes excessively large. This could cause a situation that when the image height increases, the image surface inclines in a direction departing from the object point. On the other hand, when the value exceeds the upper limit of the condition (3), the positive optical power becomes large. This could cause a situation that the image surface inclines in a direction approaching the object point. When the condition (3) is satisfied, curvature of field can be suppressed more satisfactorily. Thus, the peak of resolution can be aligned from the center to the periphery part. Further, in particular, astigmatism in the image periphery and distortion on the wide-angle limit side that are generated in the second lens unit can sufficiently be suppressed.

Further, at least one of any one of the following conditions (3)' and (3)", and the following condition (3)''' is satisfied, the above effect is achieved more successfully.

$$-1.0\times10^{-4} < (\phi 1+\phi 2+\phi 3+\phi 4)/IM \quad (3)'$$

$$0 < (\phi 1+\phi 2+\phi 3+\phi 4)/IM \quad (3)''$$

$$(\phi 1+\phi 2+\phi 3+\phi 4)/IM < 3.3\times 10^{-3} \quad (3)'''$$

(here, $Z=f_T/f_W>8.0$)

Here, the lens units constituting the zoom lens system according to Embodiments 1 to 7 are composed exclusively of refractive type lens elements that deflect the incident light by refraction (that is, lens elements of a type in which deflection is achieved at the interface between media each having a distinct refractive index). However, the present invention is not limited to the zoom lens system of this construction. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium.

Further, in the zoom lens system according to Embodiments 1 to 7, a reflecting surface may be arranged in the optical path so that the optical path may be bent before or after the zoom lens system or alternatively in the middle. The bending position may be setup arbitrarily depending on the necessity. When the optical path is bent appropriately, thickness reduction in appearance can be achieved in a camera.

As described above, according to the present invention, a zoom lens system can be obtained that realizes high image quality, a large aperture and a small size simultaneously and that employs a blur compensation function of optically compensating blur of an image due to hand blur, vibration or the like.

Embodiment 8

Figure 34:
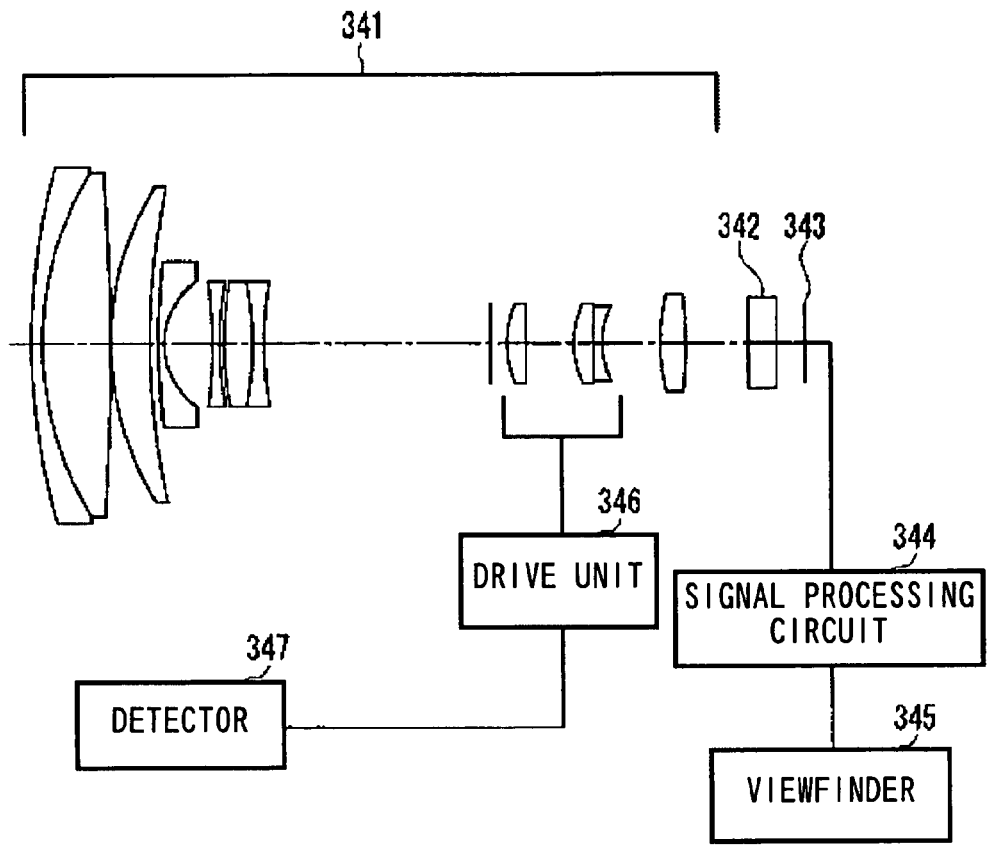
FIG. 34 is a schematic configuration diagram of a digital video camera according to Embodiment 8.

FIG. 34 is a schematic configuration diagram showing a digital video camera according to Embodiment 8, which is provided with an imaging device employing the zoom lens system of the present invention.

As shown in FIG. 34, the digital video camera according to Embodiment 8 employs an imaging device comprising: a zoom lens system that has a zoom lens 341 and a low pass filter 342 arranged on the image side of the zoom lens 341 and that forms with a variable magnification an optical image of a photographic object; and an image sensor 343 that converts the optical image of the photographic object formed by the zoom lens system into an electric signal. Further, to the image sensor 343, a viewfinder 345 is connected via a signal processing circuit 344. Here, a zoom lens system according to Embodiment 1 is employed as the zoom lens system. Thus, a digital video camera having a high-performance blur compensation function is realized. Further, to the third lens unit of the zoom lens 341, a detector 347 for detecting blur is connected via a drive unit 346 for moving the third lens unit in a direction perpendicular to the optical axis.

Here, in Embodiment 8, the zoom lens system according to Embodiment 1 is employed as a zoom lens system. However, in place of this zoom lens system, for example, the zoom lens system according to Embodiments 2 to 7 may be employed. Even when the zoom lens system according to Embodiments 2 to 7 is employed as such, a digital video camera having a high-performance blur compensation function is realized.

Embodiment 9

Figure 35:
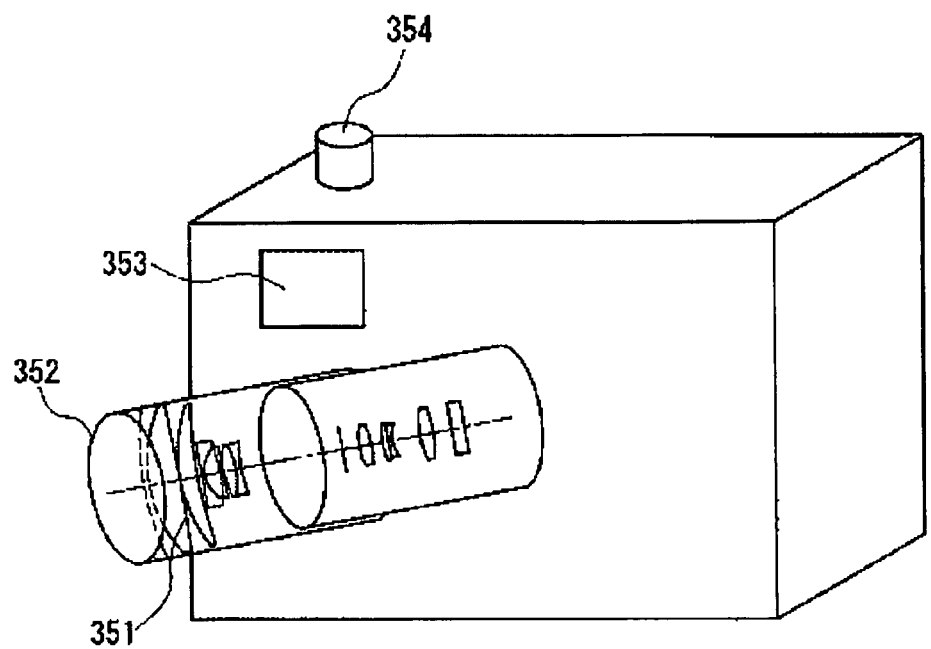
FIG. 35 is a schematic configuration diagram of a digital still camera according to Embodiment 9.

FIG. 35 is a schematic configuration diagram showing a digital still camera according to Embodiment 9, which is provided with an imaging device employing the zoom lens system of the present invention.

As shown in FIG. 35, the digital still camera according to Embodiment 9 employs: an imaging device that includes a zoom lens system 351 that forms with a variable magnification an optical image of a photographic object and that is held by a retraction type lens barrel 352 and an image sensor (not shown) that converts the optical image of the photographic object formed by the zoom lens system 351 into an electric signal; an optical viewfinder 353; and a shutter 354. Here, a zoom lens system according to Embodiment 1 is employed as the zoom lens system. Thus, a digital still camera having a high-performance blur compensation function is realized.

Here, in Embodiment 9, the zoom lens system according to Embodiment 1 is employed as a zoom lens system. However, in place of this zoom lens system, for example, the zoom lens system according to Embodiments 2 to 7 may be employed. Even when the zoom lens system according to Embodiments 2 to 7 is employed as such, a digital still camera having a high-performance blur compensation function is realized.

Further, in addition to the application to a digital video camera according to Embodiment 8 and a digital still camera according to Embodiment 9, an imaging device comprising a zoom lens system according to Embodiments 1 to 7 and an image sensor such as a CCD or a CMOS may be applied to a mobile telephone, a PDA (Personal Digital Assistance), a surveillance camera in a surveillance system, a Web camera, a vehicle-mounted camera or the like.

Numerical examples 1 to 7 are described below that serve as specific implementations of the zoom lens system according to Embodiments 1 to 7.

Here, in each numerical example, in the table of lens data, the units of the length are all "mm". Symbol r indicates the radius of curvature of the lens element surface. Symbol d indicates the thickness of the lens element or alternatively the air space between the lens elements. Symbol nd indicates the refractive index of the lens element to the d-line. Symbol ν d indicates the Abbe number of the lens element to the d-line.

Further, in each numerical example, "D+00" and the like in the table of aspherical surface data indicate "×10$^{+00}$" and the like. The sag "SAG" of the aspherical surface indicates the distance (sag) of a point on the aspherical surface at a predetermined height relative to the optical axis measured from the top of the aspherical surface, and is defined by the following formula.

$$SAG = \frac{h^2/R}{1+\sqrt{1-(1+K)(h/R)^2}} + D\cdot h^4 + E\cdot h^6 + F\cdot h^8 + G\cdot h^{10} + H\cdot h^{12} + I\cdot h^{14} + J\cdot h^{16}$$

where, h is a height relative to the optical axis

R is a radius of curvature at the top of the aspherical surface

K is the conic constant, and

D, E, F, G, H, I and J are fourth-order, sixth-order, eighth-order, tenth-order, twelfth-order, fourteenth-order and sixteenth-order aspherical coefficients, respectively.

In each numerical example, the variable air space data indicates the air space (mm) that is varied in association with zooming in a case that the object point is located at an infinity position measured from the tip of the lens elements. In the table of variable air space data, the middle position indicates the position where the magnification of the second lens unit becomes a value of −1. Here, the table that shows the variable air space data lists simultaneously the focal length f (mm), the F-number F/No and the incident view angle 2ω (degrees) of the zoom lens system at a wide-angle limit, a middle position and a telephoto limit.

Example 1

The zoom lens system of Example 1 corresponds to Embodiment 1 shown in FIG. 2. Table 1 shows the lens data of the zoom lens system of Example 1. Table 2 shows the aspherical data. Table 3 shows variable air space data.

TABLE 1

| Lens unit | Lens element | Surface | r | d | nd | vd |
|---|---|---|---|---|---|---|
| G1 | L1 | 1 | 61.588 | 1.20 | 1.84666 | 23.8 |
| | L2 | 2 | 31.619 | 6.24 | 1.48749 | 70.4 |
| | | 3 | −205.104 | 0.12 | | |
| | L3 | 4 | 26.403 | 3.76 | 1.77250 | 49.6 |
| | | 5 | 69.102 | Variable | | |
| G2 | L4 | 6 | 59.009 | 0.67 | 1.83500 | 42.7 |
| | | 7 | 7.331 | 4.56 | | |
| | L5 | 8 | −40.588 | 0.67 | 1.69680 | 55.5 |
| | | 9 | 34.199 | 0.24 | | |
| | L6 | 10 | 22.512 | 2.66 | 1.84666 | 23.8 |
| | L7 | 11 | −38.052 | 1.19 | 1.51450 | 63.1 |
| | | 12 | 45.000 | Variable | | |
| Diaphragm | | 13 | ∞ | 1.70 | | |
| G3 | L8 | 14 | 11.500 | 1.80 | 1.69680 | 55.5 |
| | | 15 | 108.197 | 4.56 | | |
| | L9 | 16 | 11.405 | 1.90 | 1.66547 | 55.2 |
| | L10 | 17 | −123.406 | 0.70 | 1.84666 | 23.8 |
| | | 18 | 9.939 | Variable | | |
| G4 | L11 | 19 | 15.266 | 2.25 | 1.60602 | 57.5 |
| | | 20 | −73.414 | Variable | | |
| P | | 21 | ∞ | 2.70 | 1.51633 | 64.0 |
| | | 22 | ∞ | | | |

TABLE 2

| Surface | 12 | 16 | 19 |
|---|---|---|---|
| K | 0.00000D+00 | −2.55218D+00 | 0.00000D+00 |
| D | −1.20154D−04 | 3.67894D−05 | −3.16284D−05 |
| E | 1.70629D−06 | −2.83781D−06 | 4.33454D−07 |
| F | −1.40573D−07 | 1.09370D−07 | 1.51181D−07 |
| G | 2.74724D−09 | −1.64130D−08 | −6.81254D−09 |
| H | 2.63591D−11 | 3.55676D−10 | −4.00874D−10 |
| I | −1.82821D−12 | 3.54057D−11 | 3.59333D−11 |
| J | 1.72737D−14 | −1.32720D−12 | −6.95756D−13 |

TABLE 3

| | Wide-angle limit | Middle position | Telephoto limit |
|---|---|---|---|
| f | 6.415 | 29.802 | 65.944 |
| F/No | 2.871 | 3.175 | 3.525 |
| 2ω | 60.656 | 13.796 | 6.210 |
| d5 | 0.700 | 19.400 | 25.493 |
| d12 | 26.440 | 5.741 | 2.250 |
| d18 | 5.436 | 4.729 | 14.251 |
| d20 | 5.952 | 9.680 | 3.066 |

Example 2

The zoom lens system of Example 2 corresponds to Embodiment 2 shown in FIG. 2. Table 4 shows the lens data of the zoom lens system of Example 2. Table 5 shows the aspherical data. Table 6 shows variable air space data.

TABLE 4

| Lens unit | Lens element | Surface | r | d | nd | vd |
|---|---|---|---|---|---|---|
| G1 | L1 | 1 | 62.284 | 1.20 | 1.84666 | 23.8 |
| | L2 | 2 | 32.353 | 5.85 | 1.48749 | 70.4 |
| | | 3 | −290.687 | 0.15 | | |
| | L3 | 4 | 27.219 | 3.76 | 1.77250 | 49.6 |
| | | 5 | 73.095 | Variable | | |
| G2 | L4 | 6 | 54.759 | 0.70 | 1.83500 | 42.7 |
| | | 7 | 7.366 | 3.50 | | |
| | L5 | 8 | −28.160 | 0.70 | 1.69680 | 55.5 |
| | | 9 | 45.709 | 0.65 | | |
| | L6 | 10 | 19.282 | 2.20 | 1.84666 | 23.8 |
| | L7 | 11 | −57.168 | 1.19 | 1.51450 | 63.1 |
| | | 12 | 45.000 | Variable | | |
| Diaphragm | | 13 | ∞ | 1.70 | | |
| G3 | L8 | 14 | 9.594 | 1.80 | 1.69680 | 55.5 |
| | | 15 | 133.571 | 3.00 | | |
| | L9 | 16 | 13.063 | 1.70 | 1.66547 | 55.2 |
| | L10 | 17 | −700.000 | 0.70 | 1.84666 | 23.8 |
| | | 18 | 8.680 | Variable | | |
| G4 | L11 | 19 | 14.586 | 2.00 | 1.60602 | 57.5 |
| | | 20 | −78.756 | Variable | | |
| P | | 21 | ∞ | 0.90 | 1.51633 | 64.0 |
| | | 22 | ∞ | | | |

TABLE 5

| Surface | 12 | 16 | 19 |
|---|---|---|---|
| K | 0.00000D+00 | −4.38993D+00 | 0.00000D+00 |
| D | −6.51801D−05 | −3.96068D−05 | −1.34758D−05 |
| E | −5.89617D−08 | −4.81639D−06 | −1.14164D−06 |
| F | −2.92337D−08 | −3.50722D−08 | 2.59760D−07 |
| G | 1.09434D−09 | −1.69043D−08 | −1.11861D−08 |
| H | 9.06062D−12 | 9.13982D−10 | −4.80431D−10 |
| I | −1.87719D−12 | 6.09242D−11 | 5.39239D−11 |
| J | 3.23786D−14 | −4.50248D−12 | −1.22109D−12 |

TABLE 6

| | Wide-angle limit | Middle position | Telephoto limit |
|---|---|---|---|
| f | 6.350 | 29.998 | 65.995 |
| F/No | 2.846 | 3.145 | 3.751 |
| 2ω | 61.426 | 13.732 | 6.216 |
| d5 | 0.700 | 20.461 | 26.107 |
| d12 | 28.682 | 6.427 | 2.250 |
| d18 | 6.244 | 5.491 | 16.900 |
| d20 | 6.496 | 10.214 | 4.089 |

Example 3

The zoom lens system of Example 3 corresponds to Embodiment 3 shown in FIG. 2. Table 7 shows the lens data of the zoom lens system of Example 3. Table 8 shows the aspherical data. Table 9 shows variable air space data.

TABLE 7

| Lens unit | Lens element | Surface | r | d | nd | νd |
|---|---|---|---|---|---|---|
| G1 | L1 | 1 | 50.601 | 1.20 | 1.84666 | 23.8 |
|  | L2 | 2 | 27.888 | 5.75 | 1.48749 | 70.4 |
|  |  | 3 | ∞ | 0.15 |  |  |
|  | L3 | 4 | 27.857 | 3.90 | 1.77250 | 49.6 |
|  |  | 5 | 96.848 | Variable |  |  |
| G2 | L4 | 6 | 48.894 | 0.70 | 1.83500 | 43.0 |
|  |  | 7 | 7.186 | 4.25 |  |  |
|  | L5 | 8 | −46.326 | 0.70 | 1.69680 | 55.5 |
|  |  | 9 | 48.831 | 0.65 |  |  |
|  | L6 | 10 | 16.708 | 2.20 | 1.84666 | 23.8 |
|  | L7 | 11 | −83.169 | 1.20 | 1.66547 | 55.2 |
|  |  | 12 | 21.796 | Variable |  |  |
| Diaphragm |  | 13 | ∞ | 1.80 |  |  |
| G3 | L8 | 14 | 10.112 | 1.80 | 1.83500 | 43.0 |
|  |  | 15 | 72.547 | 3.00 |  |  |
|  | L9 | 16 | 12.472 | 1.50 | 1.66547 | 55.2 |
|  | L10 | 17 | −28.143 | 0.70 | 1.84666 | 23.8 |
|  |  | 18 | 8.426 | Variable |  |  |
| G4 | L11 | 19 | 15.175 | 2.00 | 1.66547 | 55.2 |
|  |  | 20 | −107.519 | Variable |  |  |
| P |  | 21 | ∞ | 0.90 | 1.51633 | 64.0 |
|  |  | 22 | ∞ |  |  |  |

TABLE 8

| Surface | 12 | 16 | 19 |
|---|---|---|---|
| K | 0.00000D+00 | −3.55773D+00 | 0.00000D+00 |
| D | −5.45739D−05 | −2.67932D−05 | −2.99258D−05 |
| E | −4.28401D−06 | −9.31455D−06 | 1.05353D−06 |
| F | 3.72242D−07 | 1.65747D−06 | 1.67655D−08 |
| G | −1.74199D−08 | −2.68805D−07 | −1.52943D−08 |
| H | 3.25589D−10 | 2.12721D−08 | 2.00633D−09 |
| I | −3.96122D−13 | −8.49633D−10 | −1.04957D−10 |
| J | −3.97166D−14 | 1.33954D−11 | 1.93998D−12 |

TABLE 9

|  | Wide-angle limit | Middle position | Telephoto limit |
|---|---|---|---|
| f | 6.038 | 40.018 | 69.345 |
| F/No | 2.861 | 3.291 | 3.239 |
| 2ω | 63.512 | 10.268 | 5.872 |
| d5 | 0.600 | 21.274 | 25.516 |
| d12 | 28.229 | 4.458 | 2.100 |
| d18 | 5.800 | 5.800 | 11.750 |
| d20 | 6.884 | 11.127 | 4.374 |

Example 4

The zoom lens system of Example 4 corresponds to Embodiment 4 shown in FIG. 2. Table 10 shows the lens data of the zoom lens system of Example 4. Table 11 shows the aspherical data. Table 12 shows variable air space data.

TABLE 10

| Lens unit | Lens element | Surface | r | d | nd | νd |
|---|---|---|---|---|---|---|
| G1 | L1 | 1 | 48.799 | 1.20 | 1.84666 | 23.8 |
|  | L2 | 2 | 28.694 | 5.75 | 1.49700 | 81.6 |
|  |  | 3 | ∞ | 0.15 |  |  |
|  | L3 | 4 | 28.139 | 3.90 | 1.77250 | 49.6 |
|  |  | 5 | 85.072 | Variable |  |  |

TABLE 10-continued

| Lens unit | Lens element | Surface | r | d | nd | νd |
|---|---|---|---|---|---|---|
| G2 | L4 | 6 | 43.685 | 0.70 | 1.83500 | 43.0 |
|  |  | 7 | 6.980 | 4.25 |  |  |
|  | L5 | 8 | −47.363 | 0.70 | 1.69680 | 55.5 |
|  |  | 9 | 47.363 | 0.65 |  |  |
|  | L6 | 10 | 18.757 | 2.20 | 1.84666 | 23.8 |
|  | L7 | 11 | −54.232 | 1.20 | 1.66547 | 55.2 |
|  |  | 12 | 25.586 | Variable |  |  |
| Diaphragm |  | 13 | ∞ | 1.80 |  |  |
| G3 | L8 | 14 | 10.117 | 1.80 | 1.83500 | 43.0 |
|  |  | 15 | 71.484 | 3.00 |  |  |
|  | L9 | 16 | 12.521 | 1.50 | 1.66547 | 55.2 |
|  | L10 | 17 | −28.538 | 0.70 | 1.84666 | 23.8 |
|  |  | 18 | 8.410 | Variable |  |  |
| G4 | L11 | 19 | 15.427 | 2.00 | 1.66547 | 55.2 |
|  |  | 20 | −89.922 | Variable |  |  |
| P |  | 21 | ∞ | 0.90 | 1.51633 | 64.0 |
|  |  | 22 | ∞ |  |  |  |

TABLE 11

| Surface | 12 | 16 | 19 |
|---|---|---|---|
| K | 0.00000D+00 | −3.54041D+00 | 0.00000D+00 |
| D | −7.68135D−05 | −3.12625D−05 | −3.33429D−05 |
| E | −4.51055D−06 | −1.21676D−05 | 8.70130D−07 |
| F | 3.87570D−07 | 2.20023D−06 | 9.14783D−08 |
| G | −1.75982D−08 | −2.72511D−07 | −1.66285D−08 |
| H | 3.14041D−10 | 1.83586D−08 | 1.72172D−09 |
| I | −5.49094D−13 | −9.80469D−10 | −1.06369D−10 |
| J | −3.08146D−14 | 3.39010D−11 | 2.64672D−12 |

TABLE 12

|  | Wide-angle limit | Middle position | Telephoto limit |
|---|---|---|---|
| f | 5.978 | 40.005 | 69.411 |
| F/No | 2.857 | 3.288 | 3.226 |
| 2ω | 63.350 | 10.256 | 5.868 |
| d5 | 0.600 | 21.243 | 25.437 |
| d12 | 28.410 | 4.551 | 2.100 |
| d18 | 5.700 | 5.700 | 11.550 |
| d20 | 6.998 | 11.262 | 4.756 |

Example 5

The zoom lens system of Example 5 corresponds to Embodiment 5 shown in FIG. 19. Table 13 shows the lens data of the zoom lens system of Example 5. Table 14 shows the aspherical data. Table 15 shows variable air space data.

TABLE 13

| Lens unit | Lens element | Surface | r | d | nd | νd |
|---|---|---|---|---|---|---|
| G1 | L1 | 1 | 60.140 | 1.20 | 1.84666 | 23.8 |
|  | L2 | 2 | 31.749 | 5.75 | 1.48749 | 70.4 |
|  |  | 3 | −208.635 | 0.15 |  |  |
|  | L3 | 4 | 27.754 | 3.90 | 1.77250 | 49.6 |
|  |  | 5 | 78.844 | Variable |  |  |
| G2 | L4 | 6 | 49.264 | 0.70 | 1.83500 | 43.0 |
|  |  | 7 | 7.413 | 4.25 |  |  |
|  | L5 | 8 | −50.000 | 0.70 | 1.72916 | 54.7 |
|  |  | 9 | 20.303 | 0.65 |  |  |
|  | L6 | 10 | 14.087 | 2.20 | 1.84666 | 23.8 |
|  | L7 | 11 | ∞ | 1.20 | 1.66547 | 55.2 |
|  |  | 12 | 32.481 | Variable |  |  |

TABLE 13-continued

| Lens unit | Lens element | Surface | r | d | nd | vd |
|---|---|---|---|---|---|---|
| Diaphragm | | 13 | ∞ | 1.80 | | |
| G3 | L8 | 14 | 7.434 | 1.80 | 1.83500 | 43.0 |
| | | 15 | 30.001 | 2.00 | | |
| | L9 | 16 | −368.642 | 0.70 | 1.84666 | 23.8 |
| | | 17 | 7.155 | 0.50 | | |
| | L10 | 18 | 10.600 | 1.50 | 1.66547 | 55.2 |
| | | 19 | −48.565 | Variable | | |
| G4 | L11 | 20 | 20.074 | 2.00 | 1.66547 | 55.2 |
| | | 21 | 62.433 | Variable | | |
| P | | 22 | ∞ | 2.70 | 1.51633 | 64.0 |
| | | 23 | ∞ | | | |

TABLE 14

| Surface | 12 | 16 | 20 |
|---|---|---|---|
| K | 0.00000D+00 | −2.61333D+00 | 0.00000D+00 |
| D | −1.17494D−05 | −1.58844D−04 | −6.84244D−05 |
| E | −4.22305D−06 | −1.18101D−05 | 3.58071D−05 |
| F | 4.45029D−07 | 3.17339D−06 | −6.60803D−06 |
| G | −1.92847D−08 | −4.64791D−07 | 1.98332D−07 |
| H | 2.98157D−10 | −1.13597D−08 | 5.07538D−08 |
| I | 1.93940D−12 | 6.67094D−09 | −4.92324D−09 |
| J | −7.06171D−14 | −3.72379D−10 | 1.29950D−10 |

TABLE 15

| | Wide-angle limit | Middle position | Telephoto limit |
|---|---|---|---|
| f | 6.118 | 39.952 | 69.769 |
| F/No | 2.875 | 3.383 | 3.432 |
| 2ω | 62.356 | 10.200 | 5.838 |
| d5 | 0.600 | 21.501 | 25.509 |
| d12 | 28.500 | 5.200 | 2.100 |
| d19 | 5.800 | 4.700 | 15.294 |
| d21 | 6.607 | 11.958 | 1.500 |

Example 6

The zoom lens system of Example 6 corresponds to Embodiment 6 shown in FIG. 25. Table 16 shows the lens data of the zoom lens system of Example 6. Table 17 shows the aspherical data. Table 18 shows variable air space data.

TABLE 16

| Lens unit | Lens element | Surface | r | d | nd | vd |
|---|---|---|---|---|---|---|
| G1 | L1 | 1 | 67.455 | 1.30 | 1.84666 | 23.8 |
| | L2 | 2 | 36.777 | 6.00 | 1.49700 | 81.6 |
| | | 3 | −202.270 | 0.15 | | |
| | L3 | 4 | 31.594 | 3.90 | 1.77250 | 49.6 |
| | | 5 | 82.571 | Variable | | |
| G2 | L4 | 6 | 82.571 | 0.70 | 1.83500 | 43.0 |
| | | 7 | 7.779 | 4.80 | | |
| | L5 | 8 | −29.474 | 0.70 | 1.69680 | 55.5 |
| | | 9 | −747.094 | 0.26 | | |
| | L6 | 10 | 35.171 | 2.80 | 1.84666 | 23.8 |
| | L7 | 11 | −25.959 | 1.25 | 1.60602 | 57.5 |
| | | 12 | 43.000 | Variable | | |
| Diaphragm | | 13 | ∞ | 1.70 | | |
| G3 | L8 | 14 | 12.126 | 1.80 | 1.72916 | 54.7 |
| | | 15 | 88.074 | 4.56 | | |
| | L9 | 16 | 16.085 | 1.90 | 1.66547 | 55.2 |
| | L10 | 17 | −700.000 | 0.70 | 1.84666 | 23.8 |
| | | 18 | 12.297 | Variable | | |

TABLE 16-continued

| Lens unit | Lens element | Surface | r | d | nd | vd |
|---|---|---|---|---|---|---|
| G4 | L11 | 19 | 15.724 | 2.45 | 1.69680 | 55.5 |
| | L12 | 20 | −15.724 | 1.20 | 1.83500 | 42.7 |
| | L13 | 21 | 100.000 | 2.25 | 1.51450 | 63.1 |
| | | 22 | −32.044 | Variable | | |
| P | | 23 | ∞ | 2.70 | 1.51633 | 64.0 |
| | | 24 | ∞ | | | |

TABLE 17

| Surface | 12 | 16 | 22 |
|---|---|---|---|
| K | 0.00000D+00 | −4.97867D+00 | 0.00000D+00 |
| D | −8.31471D−05 | −2.33738D−06 | 5.17929D−05 |
| E | −1.32743D−06 | −2.28353D−06 | −1.11428D−06 |
| F | 3.88403D−08 | 1.29047D−07 | 7.73931D−08 |
| G | −6.46641D−11 | −1.48283D−08 | −3.95170D−09 |
| H | −6.72552D−11 | 2.78065D−10 | 1.60551D−10 |
| I | 2.13987D−12 | 2.17676D−11 | −1.03934D−11 |
| J | −2.13165D−14 | −6.11338D−13 | 3.02287D−13 |

TABLE 18

| | Wide-angle limit | Middle position | Telephoto limit |
|---|---|---|---|
| f | 5.985 | 42.795 | 69.993 |
| F/No | 2.855 | 3.200 | 2.908 |
| 2ω | 64.612 | 9.584 | 6.054 |
| d5 | 0.700 | 25.251 | 30.488 |
| d12 | 32.749 | 3.453 | 2.250 |
| d18 | 7.555 | 6.147 | 8.769 |
| d22 | 4.987 | 11.122 | 4.477 |

Example 7

The zoom lens system of Example 7 corresponds to Embodiment 7 shown in FIG. 25. Table 19 shows the lens data of the zoom lens system of Example 7. Table 20 shows the aspherical data. Table 21 shows variable air space data.

TABLE 19

| Lens unit | Lens element | Surface | r | d | nd | vd |
|---|---|---|---|---|---|---|
| G1 | L1 | 1 | 66.485 | 1.30 | 1.84666 | 23.8 |
| | L2 | 2 | 36.112 | 6.00 | 1.49700 | 81.6 |
| | | 3 | −204.626 | 0.15 | | |
| | L3 | 4 | 31.095 | 3.90 | 1.77250 | 49.6 |
| | | 5 | 82.732 | Variable | | |
| G2 | L4 | 6 | 82.732 | 0.70 | 1.83500 | 43.0 |
| | | 7 | 7.693 | 4.80 | | |
| | L5 | 8 | −27.889 | 0.70 | 1.69680 | 55.5 |
| | | 9 | 400.896 | 0.26 | | |
| | L6 | 10 | 34.404 | 2.80 | 1.84666 | 23.8 |
| | L7 | 11 | −27.816 | 1.25 | 1.51450 | 63.1 |
| | | 12 | 37.808 | Variable | | |
| Diaphragm | | 13 | ∞ | 1.70 | | |
| G3 | L8 | 14 | 11.482 | 1.80 | 1.69680 | 55.5 |
| | | 15 | 120.569 | 4.56 | | |
| | L9 | 16 | 13.713 | 1.90 | 1.51450 | 63.1 |
| | L10 | 17 | −700.000 | 0.70 | 1.84666 | 23.8 |
| | | 18 | 12.087 | Variable | | |
| G4 | L11 | 19 | 16.099 | 2.45 | 1.69680 | 55.5 |
| | L12 | 20 | −16.099 | 1.20 | 1.83500 | 42.7 |
| | L13 | 21 | 100.000 | 2.25 | 1.60602 | 57.5 |
| | | 22 | −35.210 | Variable | | |

TABLE 19-continued

| Lens unit | Lens element | Surface | r | d | nd | vd |
|---|---|---|---|---|---|---|
| P | | 23 | ∞ | 2.70 | 1.51633 | 64.0 |
| | | 24 | ∞ | | | |

TABLE 20

| Surface | 12 | 16 | 22 |
|---|---|---|---|
| K | 0.00000D+00 | −5.07524D+00 | 0.00000D+00 |
| D | −1.03135D−04 | −3.76865D−06 | 3.85929D−05 |
| E | −9.84705D−07 | −2.70403D−06 | −1.13857D−06 |
| F | 3.18767D−08 | 6.14035D−08 | 6.25050D−08 |
| G | −1.92930D−10 | −1.77912D−08 | −4.29632D−09 |
| H | −6.76952D−11 | 3.05443D−10 | 2.16802D−10 |
| I | 2.19019D−12 | 3.19914D−11 | −7.24853D−12 |
| J | −2.04870D−14 | −4.36042D−13 | 1.21195D−13 |

TABLE 21

| | Wide-angle limit | Middle position | Telephoto limit |
|---|---|---|---|
| f | 6.007 | 42.763 | 69.735 |
| F/No | 2.877 | 3.166 | 3.795 |
| 2ω | 64.336 | 9.590 | 5.856 |
| d5 | 0.700 | 25.179 | 29.628 |
| d12 | 32.896 | 4.387 | 2.250 |
| d18 | 7.594 | 6.118 | 9.425 |
| d22 | 4.800 | 10.274 | 4.686 |

Table 22 shows values corresponding to the conditions in Examples 1 to 7.

TABLE 22

| | Condition | Example | | | | | | |
|---|---|---|---|---|---|---|---|---|
| | | 1 | 2 | 3 | 4 | 5 | 6 | 7 |
| (1) | $(|\Delta L| \cdot f_w)/(f_T \cdot IM)(\times 10^{-2})$ | 8.47 | 9.21 | 2.65 | 2.49 | 2.84 | — | — |
| (2) | $(|\Delta L3| \cdot f_w)/(f_T \cdot IM)$ | 0.08 | 0.11 | 0.04 | 0.04 | 0.05 | 0.01 | 0.02 |
| (3) | $(\phi 1 + \phi 2 + \phi 3 + \phi 4)/IM(\times 10^{-3})$ | 2.2 | 3.1 | 1.8 | 1.6 | −0.75 | 1.0 | 1.1 |

The aberration performance of the zoom lens system of Examples 1 to 7 is described below with reference to the aberration diagrams.

Figure 3:
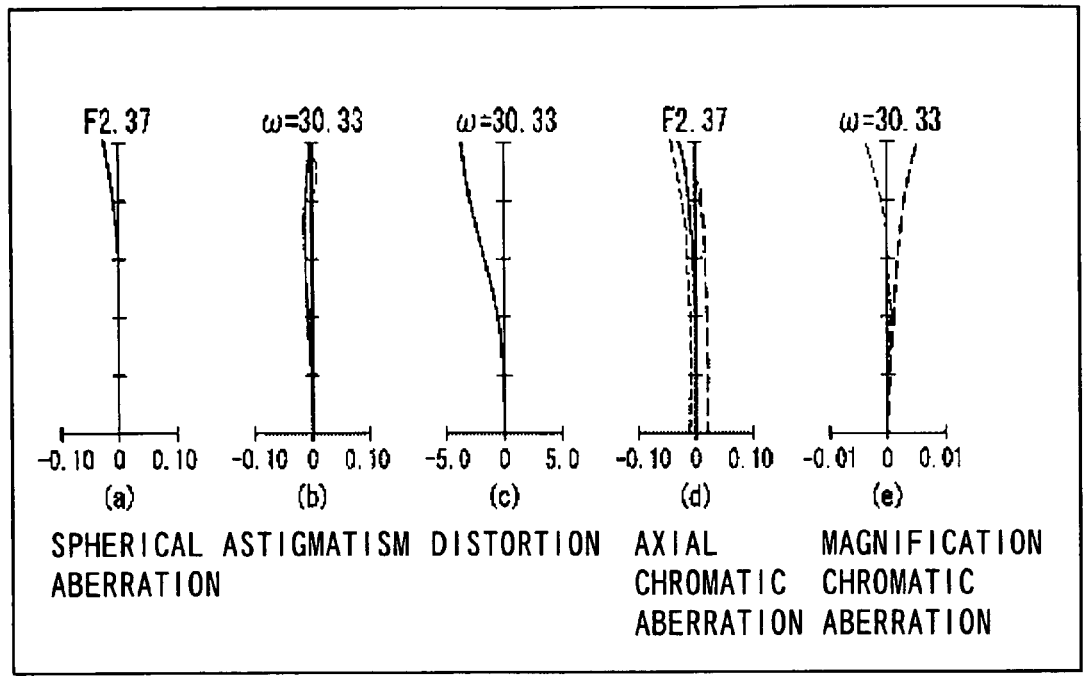
FIG. 3 is a longitudinal aberration diagram at a wide-angle limit of a zoom lens system of Example 1.
Figure 4:
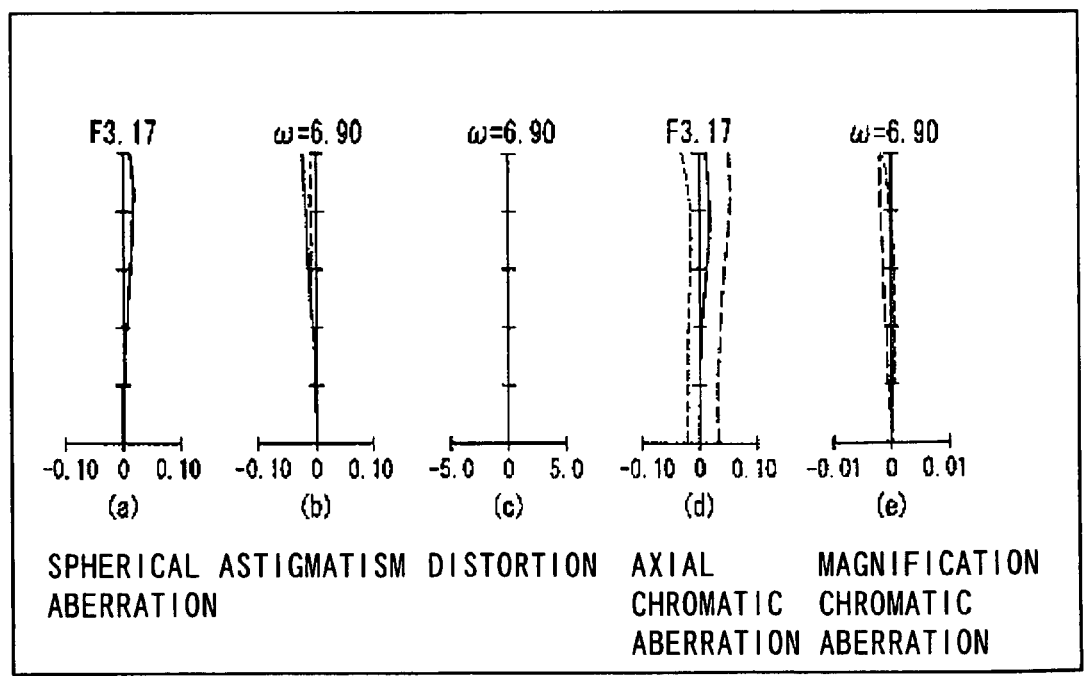
FIG. 4 is a longitudinal aberration diagram at a middle position of a zoom lens system of Example 1.
Figure 5:
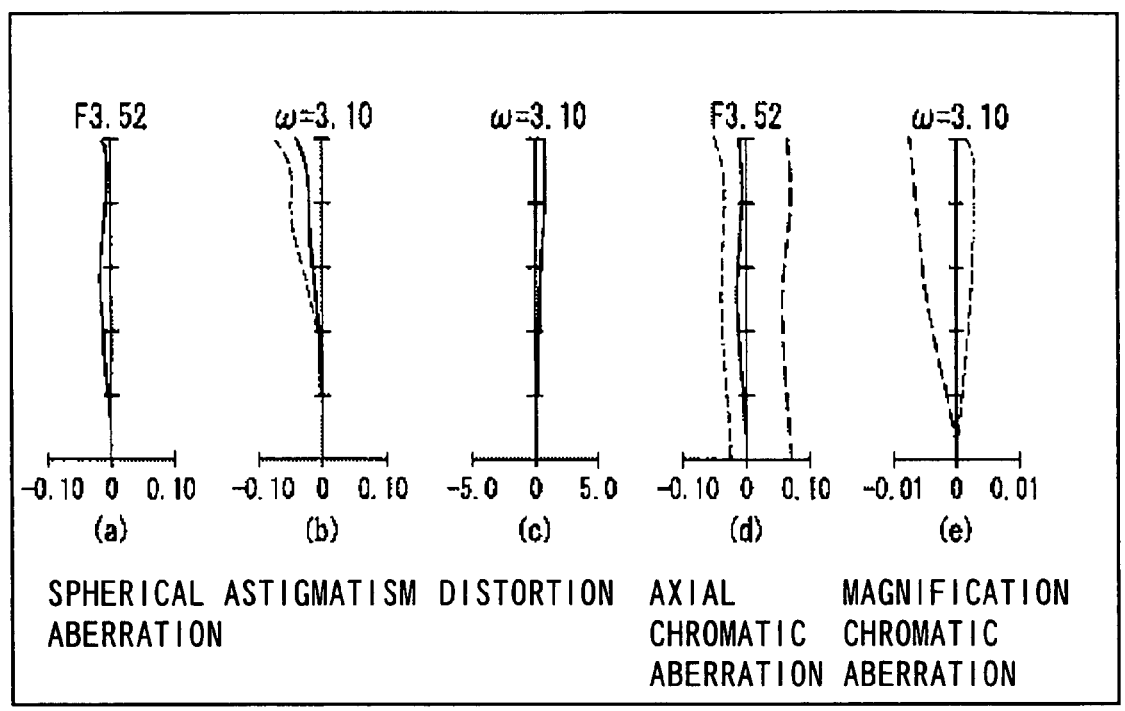
FIG. 5 is a longitudinal aberration diagram at a telephoto limit of a zoom lens system of Example 1.
Figure 7:
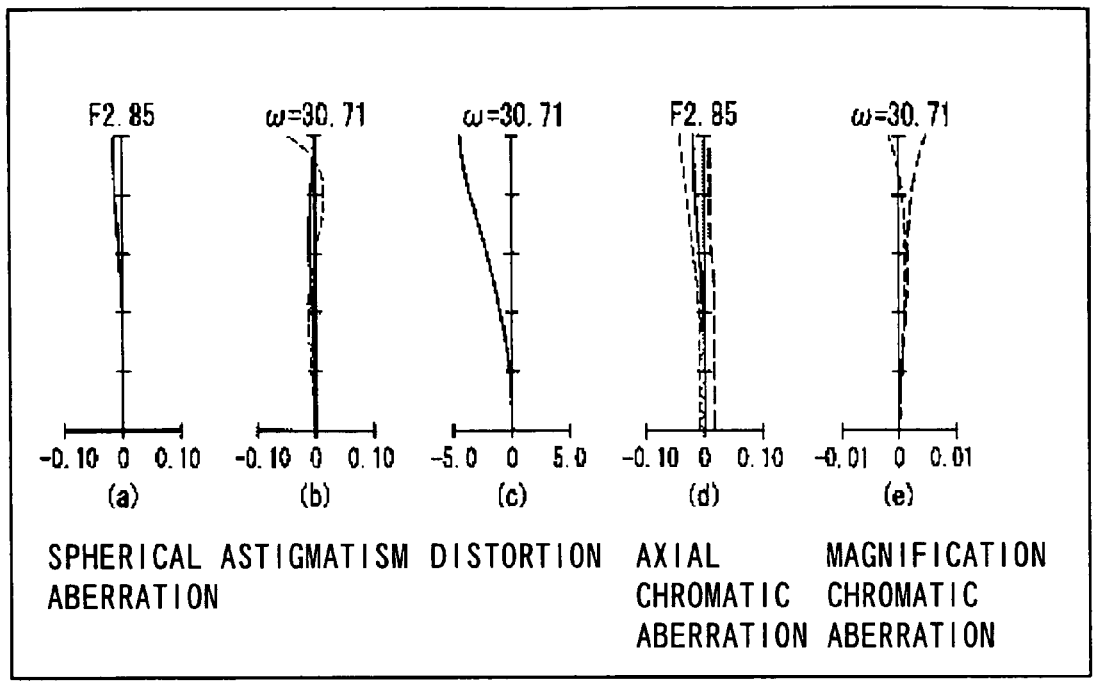
FIG. 7 is a longitudinal aberration diagram at a wide-angle limit of a zoom lens system of Example 2.
Figure 8:
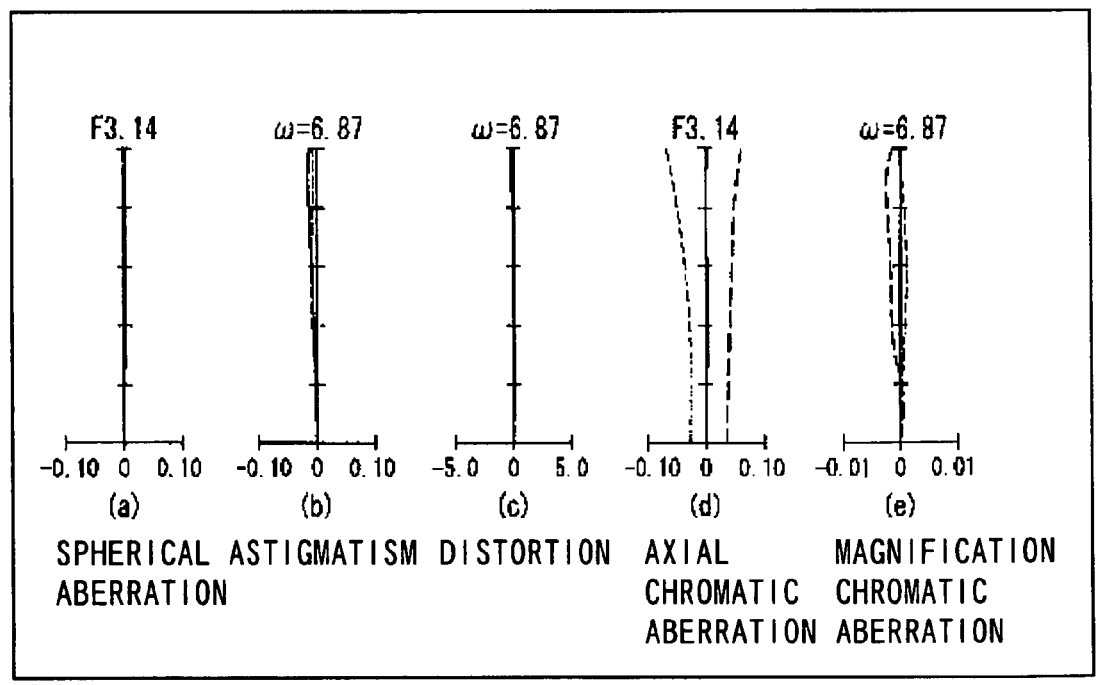
FIG. 8 is a longitudinal aberration diagram at a middle position of a zoom lens system of Example 2.
Figure 9:
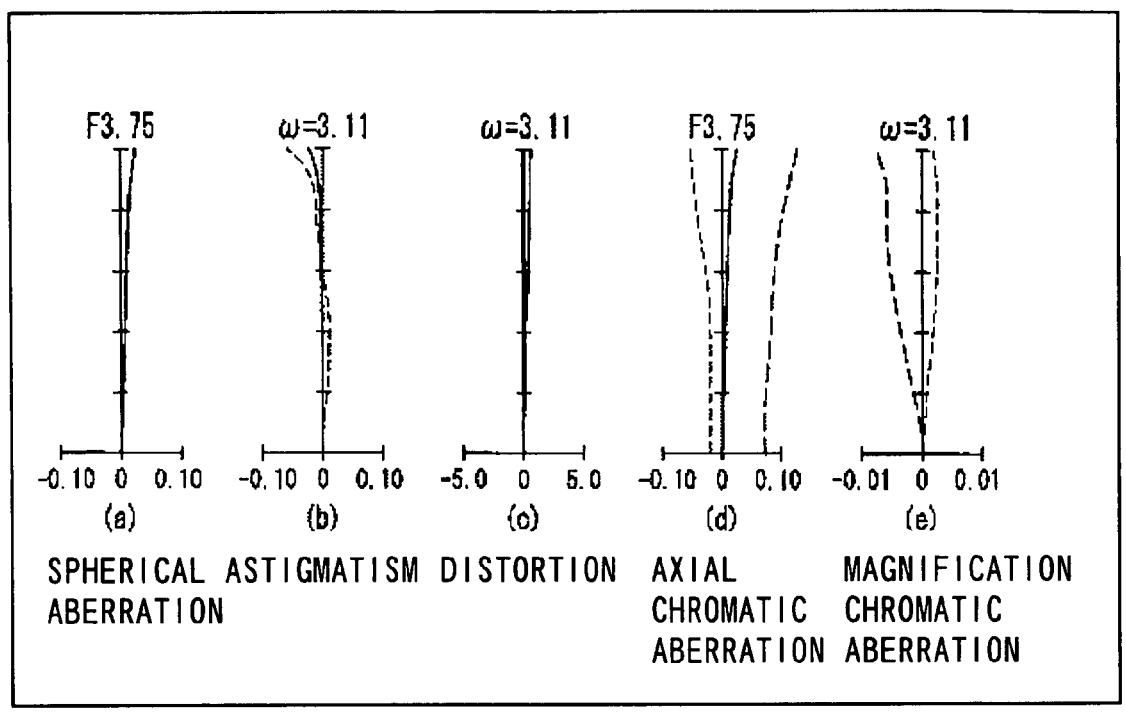
FIG. 9 is a longitudinal aberration diagram at a telephoto limit of a zoom lens system of Example 2.
Figure 11:
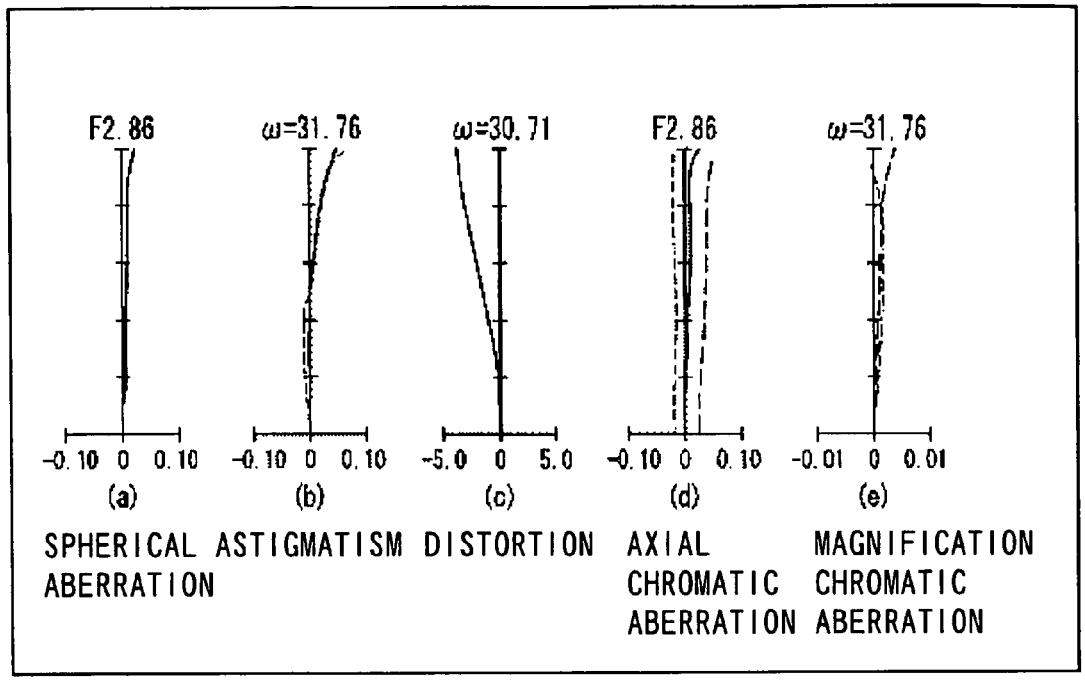
FIG. 11 is a longitudinal aberration diagram at a wide-angle limit of a zoom lens system of Example 3.
Figure 12:
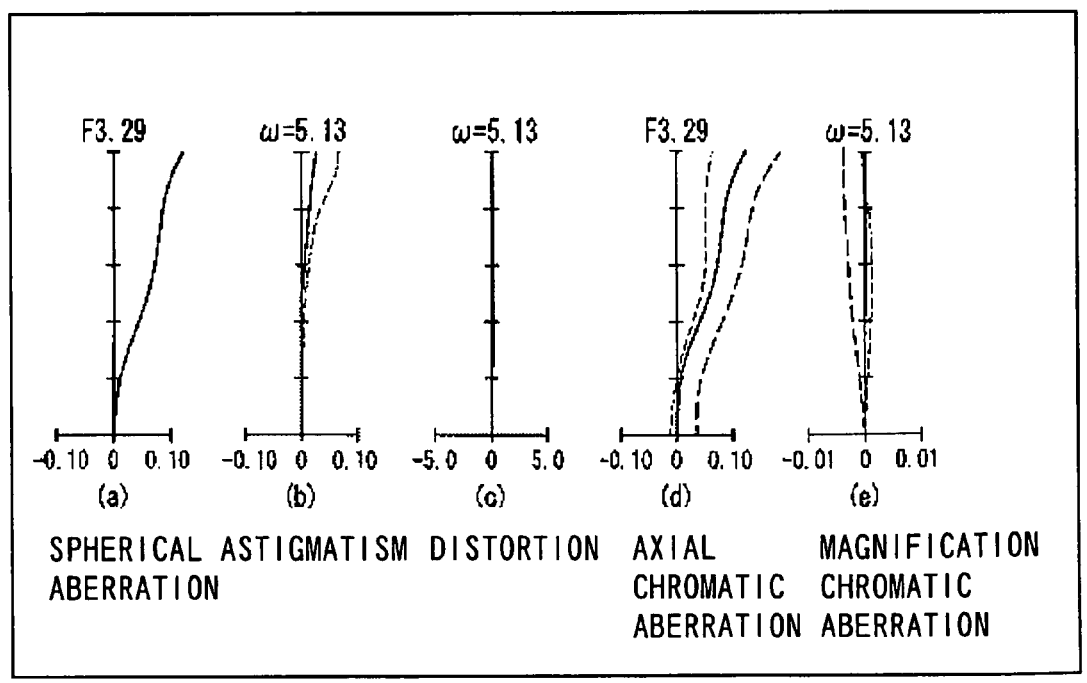
FIG. 12 is a longitudinal aberration diagram at a middle position of a zoom lens system of Example 3.
Figure 13:
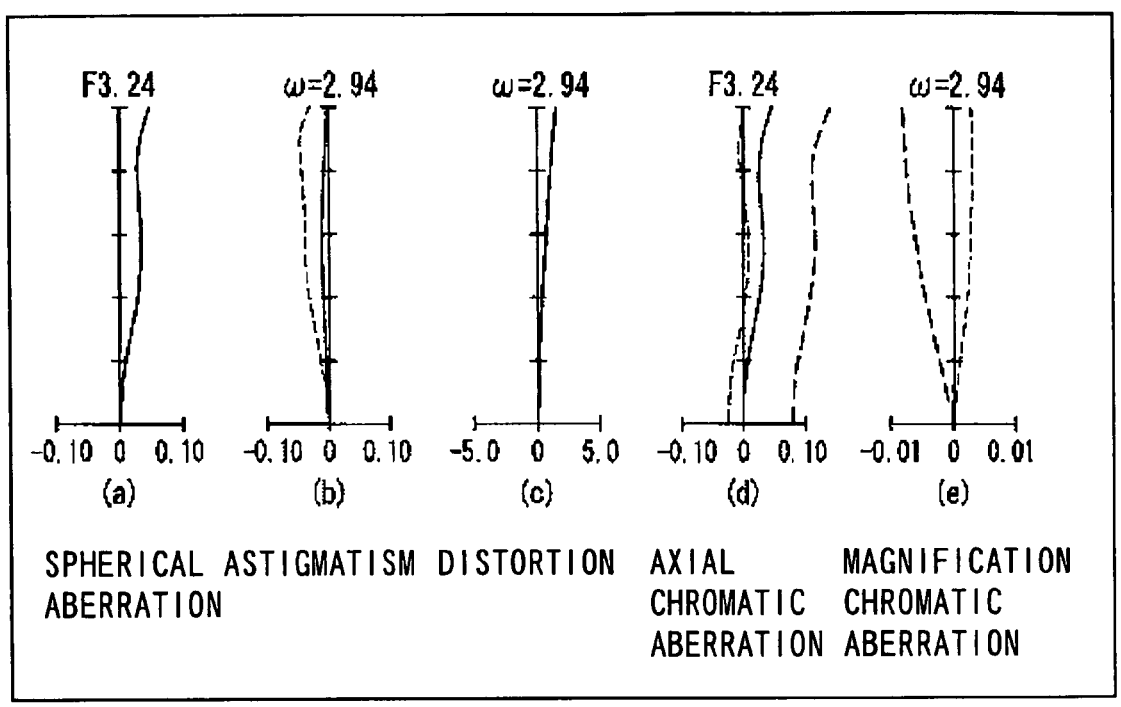
FIG. 13 is a longitudinal aberration diagram at a telephoto limit of a zoom lens system of Example 3.
Figure 15:
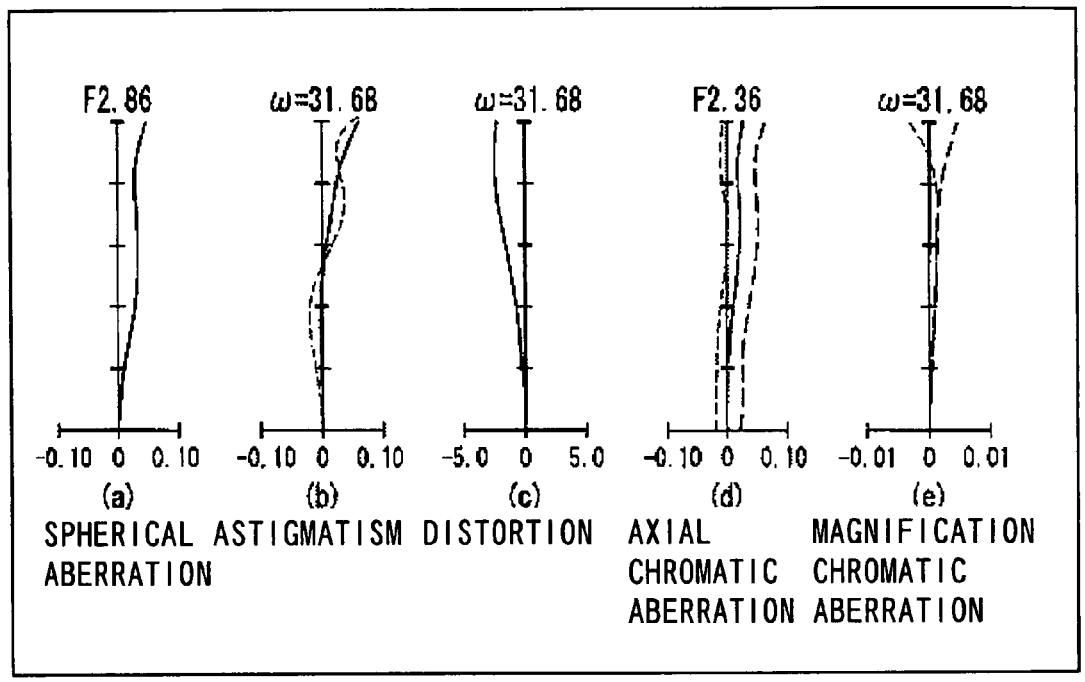
FIG. 15 is a longitudinal aberration diagram at a wide-angle limit of a zoom lens system of Example 4.
Figure 16:
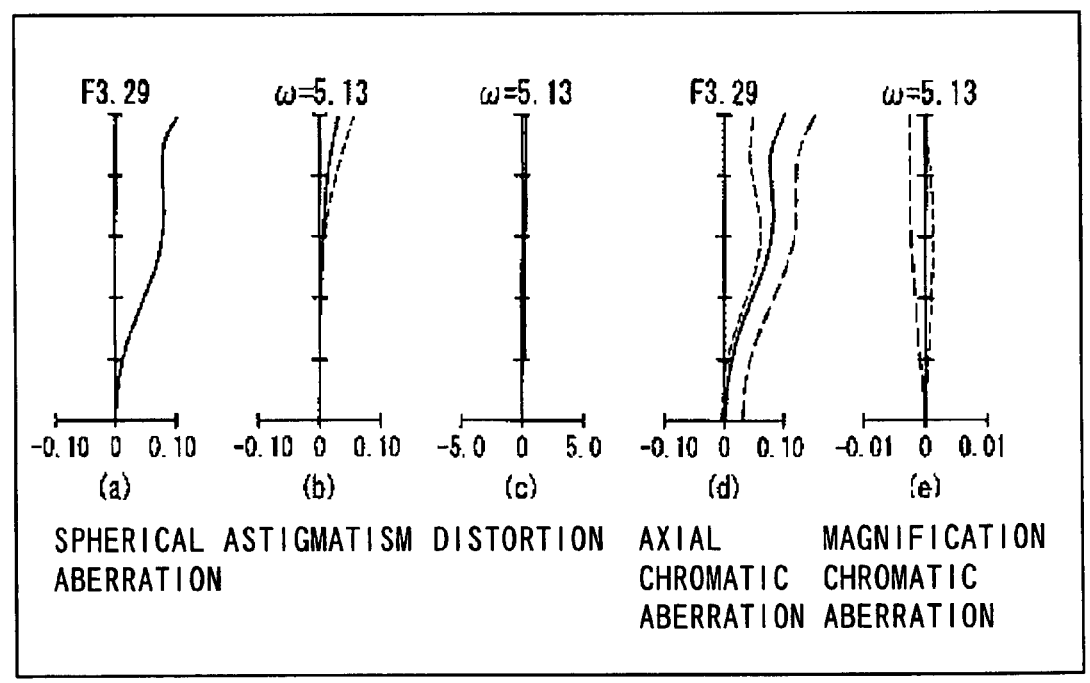
FIG. 16 is a longitudinal aberration diagram at a middle position of a zoom lens system of Example 4.
Figure 17:
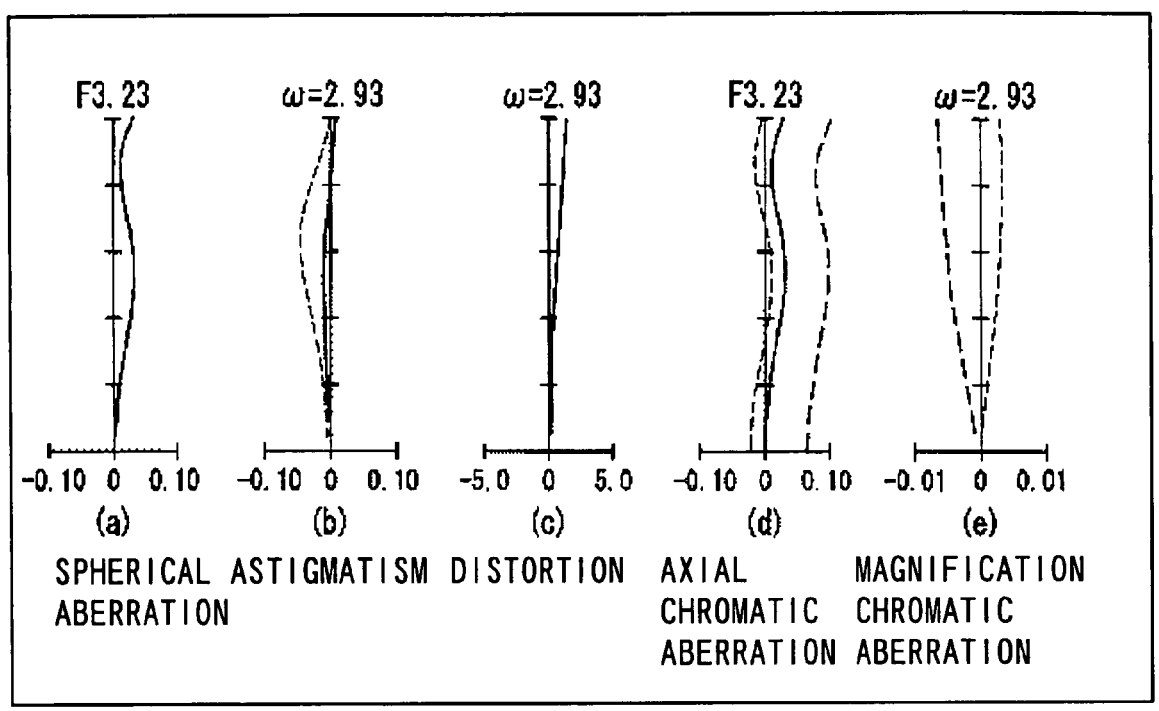
FIG. 17 is a longitudinal aberration diagram at a telephoto limit of a zoom lens system of Example 4.
Figure 20:
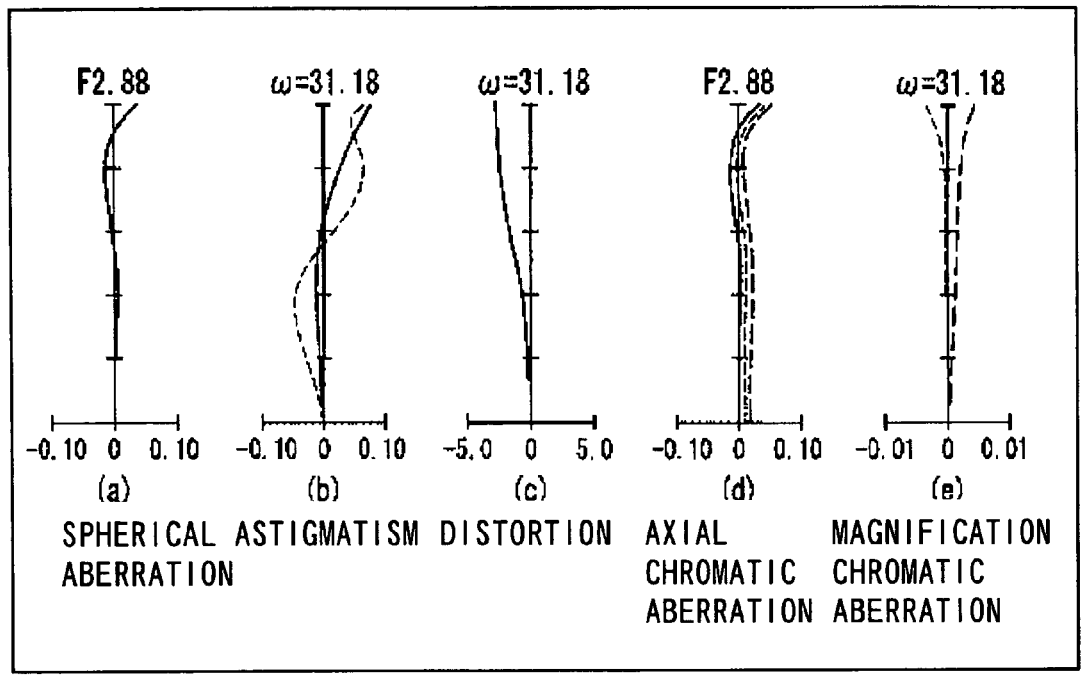
FIG. 20 is a longitudinal aberration diagram at a wide-angle limit of a zoom lens system of Example 5.
Figure 21:
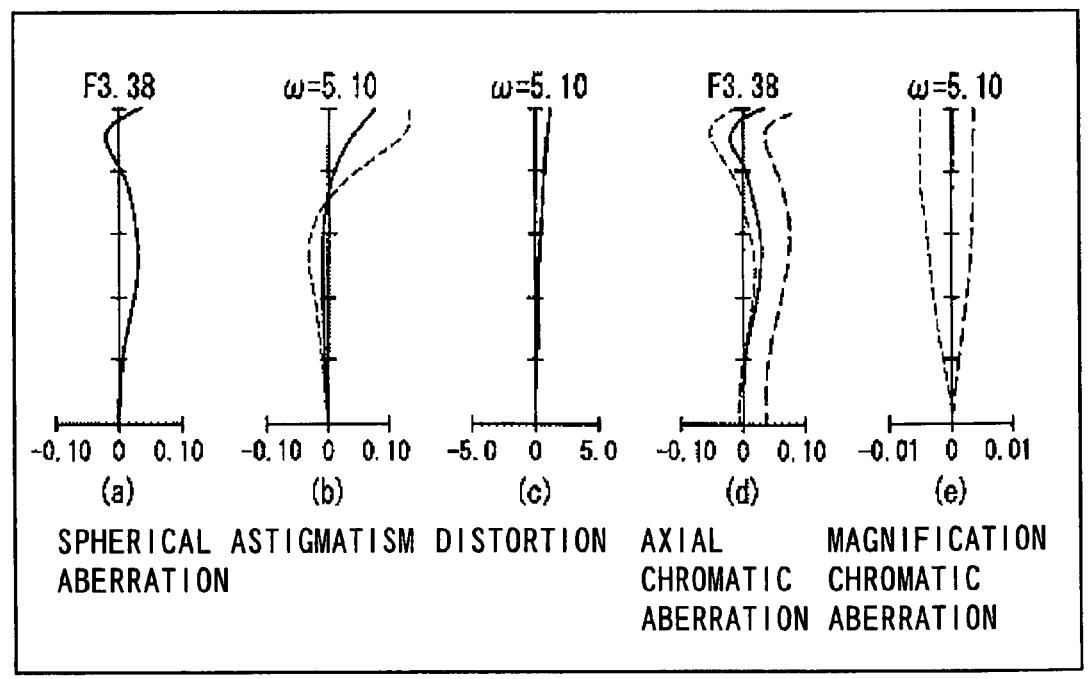
FIG. 21 is a longitudinal aberration diagram at a middle position of a zoom lens system of Example 5.
Figure 22:
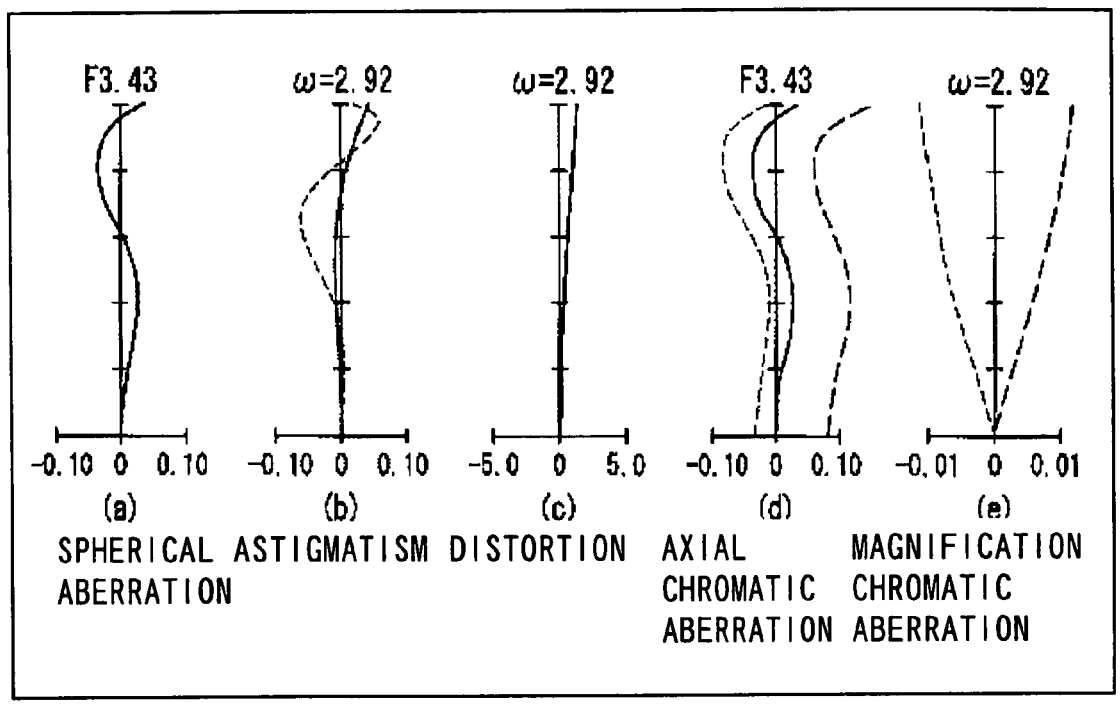
FIG. 22 is a longitudinal aberration diagram at a telephoto limit of a zoom lens system of Example 5.
Figure 26:
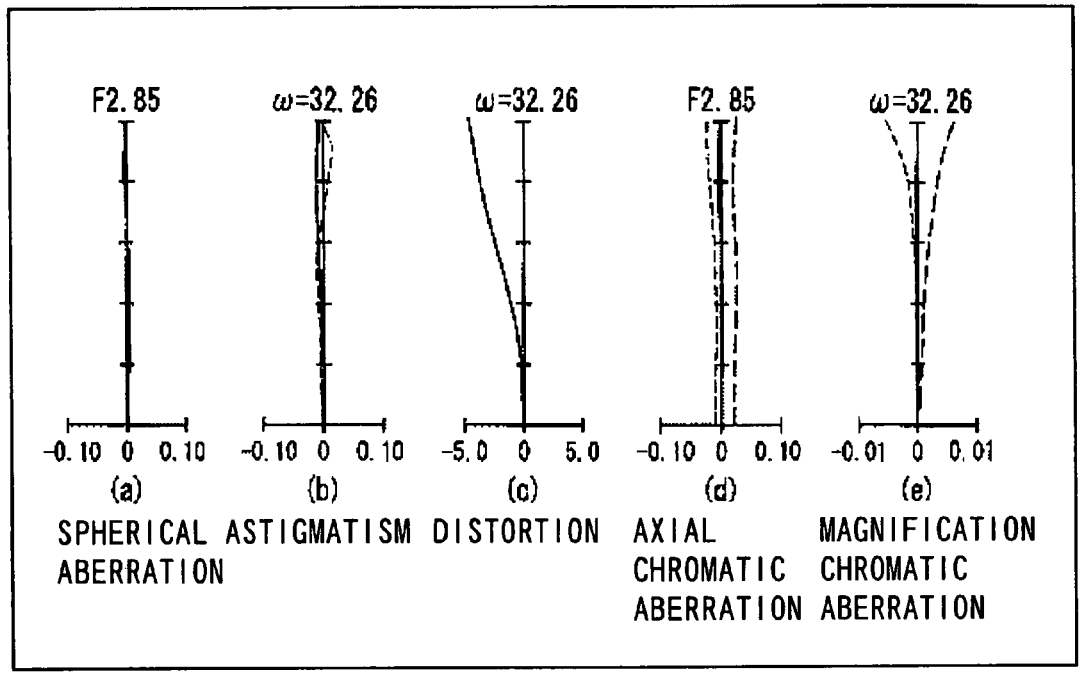
FIG. 26 is a longitudinal aberration diagram at a wide-angle limit of a zoom lens system of Example 6.
Figure 27:
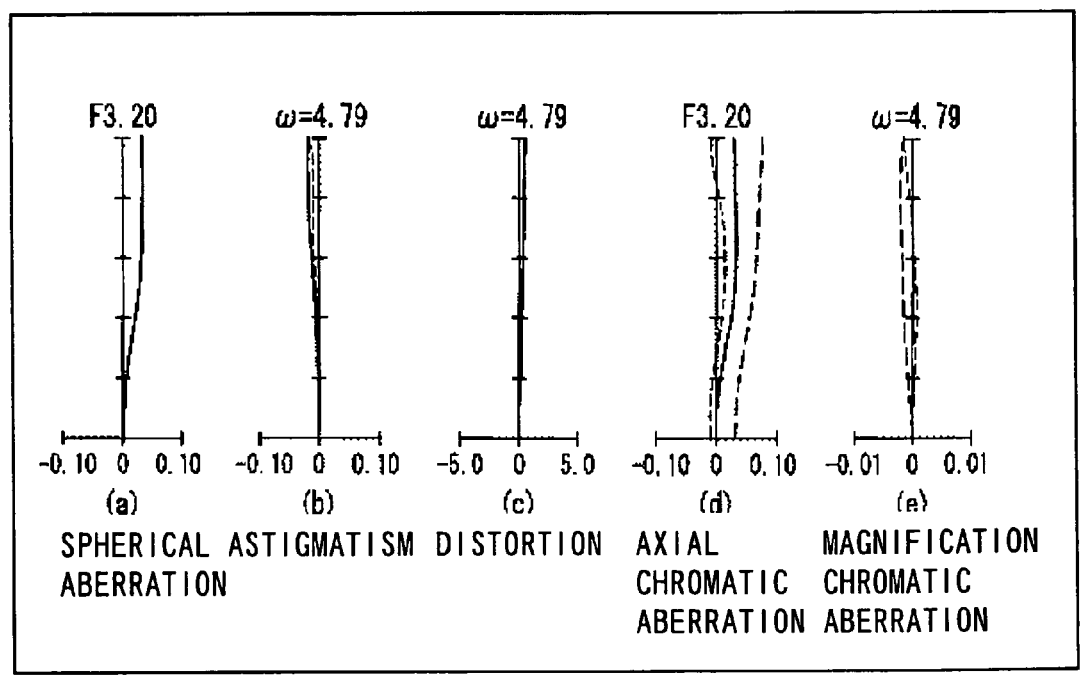
FIG. 27 is a longitudinal aberration diagram at a middle position of a zoom lens system of Example 6.
Figure 28:
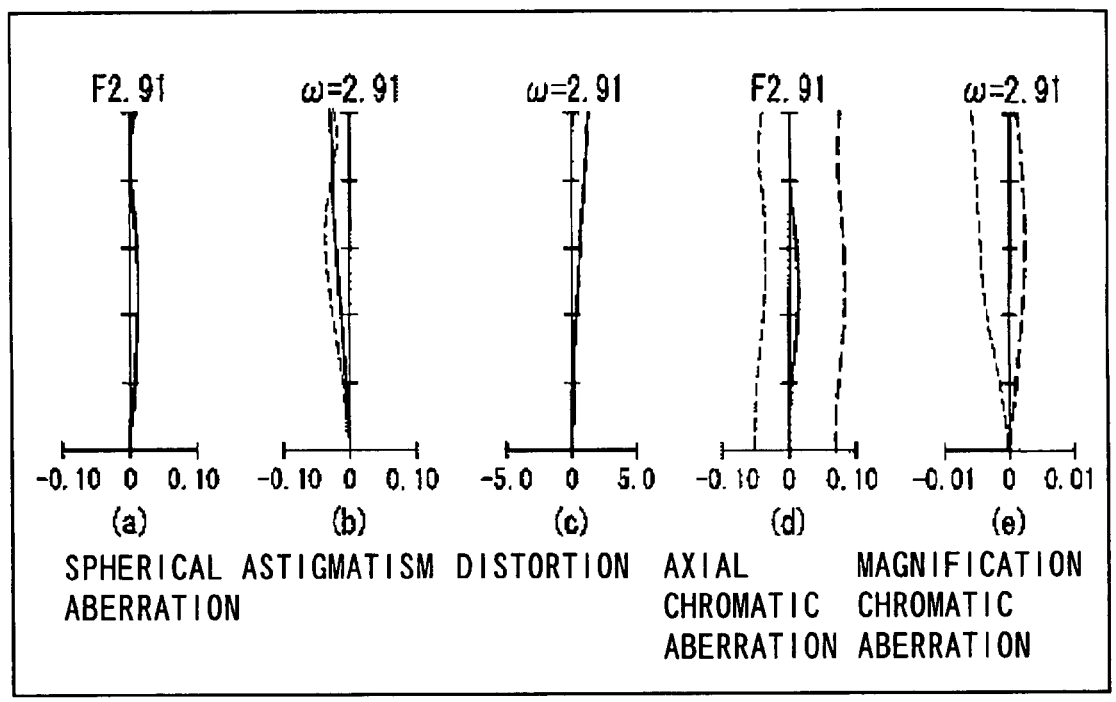
FIG. 28 is a longitudinal aberration diagram at a telephoto limit of a zoom lens system of Example 6.
Figure 30:
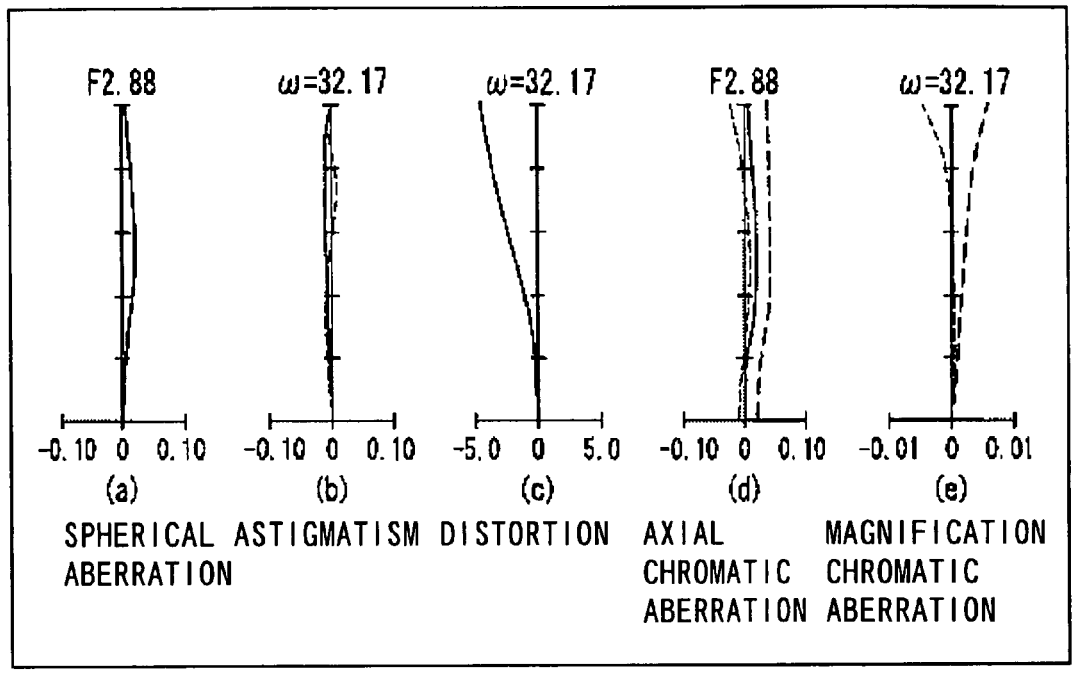
FIG. 30 is a longitudinal aberration diagram at a wide-angle limit of a zoom lens system of Example 7.
Figure 31:
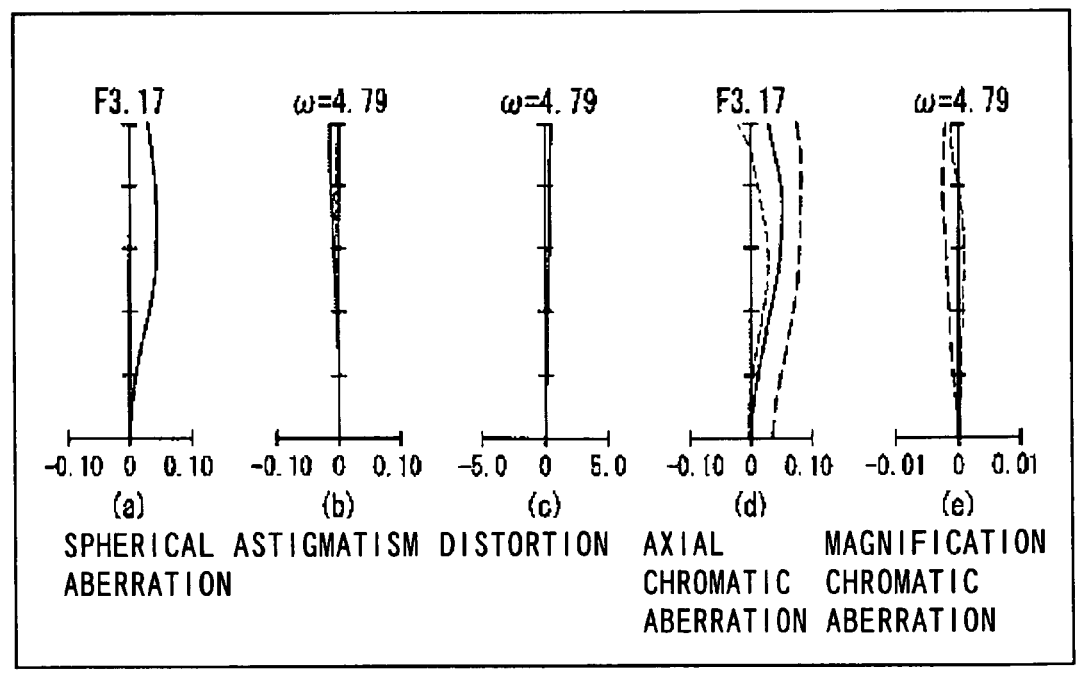
FIG. 31 is a longitudinal aberration diagram at a middle position of a zoom lens system of Example 7.
Figure 32:
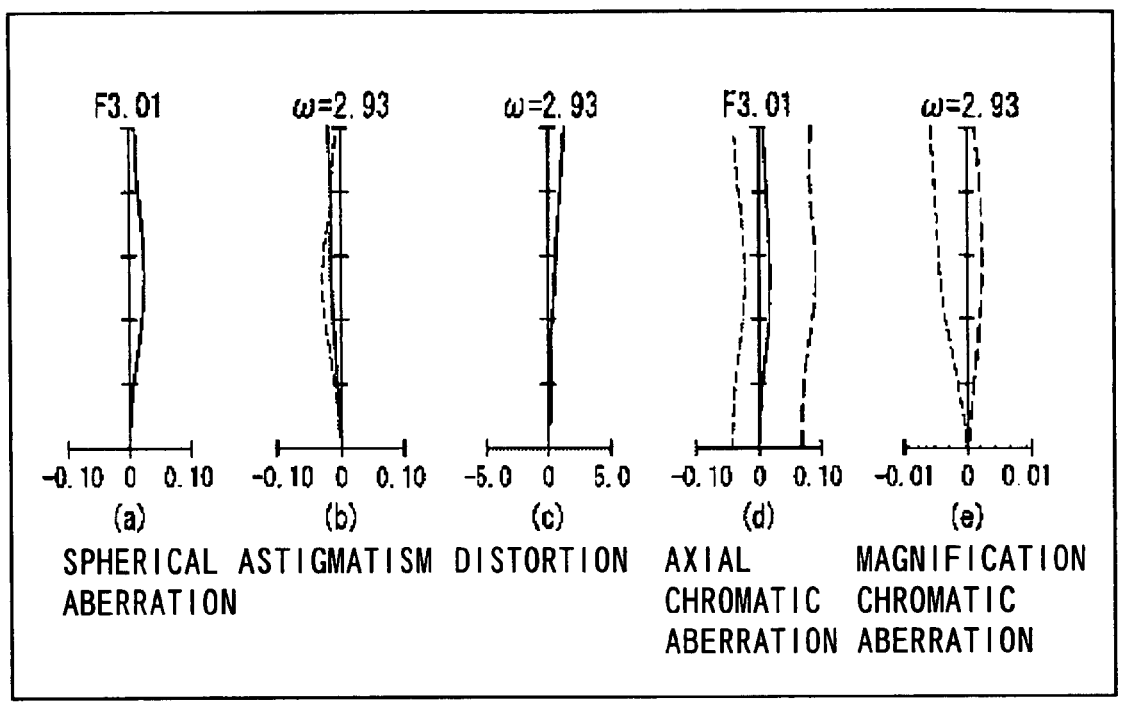
FIG. 32 is a longitudinal aberration diagram at a telephoto limit of a zoom lens system of Example 7.

FIGS. 3 to 5 are longitudinal aberration diagrams of a zoom lens system according to Example 1. FIGS. 7 to 9 are longitudinal aberration diagrams of a zoom lens system according to Example 2. FIGS. 11 to 13 are longitudinal aberration diagrams of a zoom lens system according to Example 3. FIGS. 15 to 17 are longitudinal aberration diagrams of a zoom lens system according to Example 4. FIGS. 20 to 22 are longitudinal aberration diagrams of a zoom lens system according to Example 5. FIGS. 26 to 28 are longitudinal aberration diagrams of a zoom lens system according to Example 6. FIGS. 30 to 32 are longitudinal aberration diagrams of a zoom lens system according to Example 7.

FIGS. 3, 7, 11, 15, 20, 26 and 30 show individual aberration performance at a wide-angle limit. FIGS. 4, 8, 12, 16, 21, 27 and 31 show individual aberration performance at a middle position. FIGS. 5, 9, 13, 17, 22, 28 and 32 show individual aberration performance at a telephoto limit.

In each longitudinal aberration diagram, part (a) is a spherical aberration diagram, where the vertical axis indicates the F-number, while the solid line indicates the characteristics to the d-line. Part (b) is an astigmatism diagram, where the vertical axis indicates the half view angle ω, while the solid line indicates the sagittal image plane, and while the dashed line indicates the meridional image plane. Part (c) is a distortion diagram, where the vertical axis indicates the half view angle ω. Part (d) is an axial chromatic aberration diagram, where the vertical axis indicates the F-number, while the solid line indicates the characteristics to the d-line, while the short dashed line indicates the characteristics to the F-line, and while the long dashed line indicates the characteristics to the C-line. Part (e) is a magnification chromatic aberration diagram, where the vertical axis indicates the half view angle ω, while the short dashed line indicates the characteristics to the F-line, and while the long dashed line indicates the characteristics to the C-line.

As seen from the aberration performance diagrams of FIGS. 3 to 5, 7 to 9, 11 to 13, 15 to 17, 20 to 22, 26 to 28, and 30 to 32, the zoom lens system of Examples 1 to 7 has aberration compensation capability sufficient for realizing high resolution.

Figure 6:
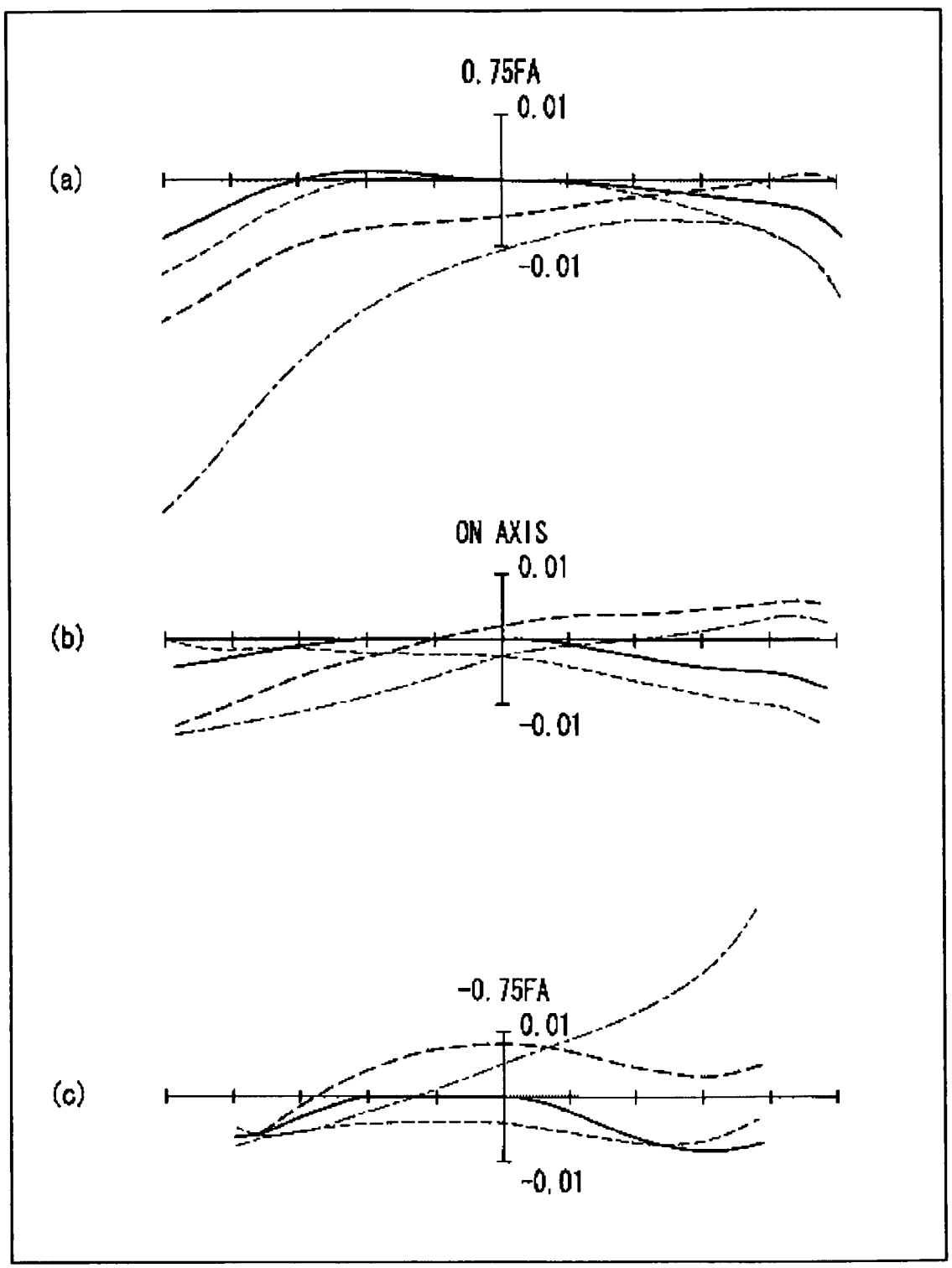
FIG. 6 is a lateral aberration diagram at the time of blur compensation at a telephoto limit of a zoom lens system of Example 1.
Figure 10:
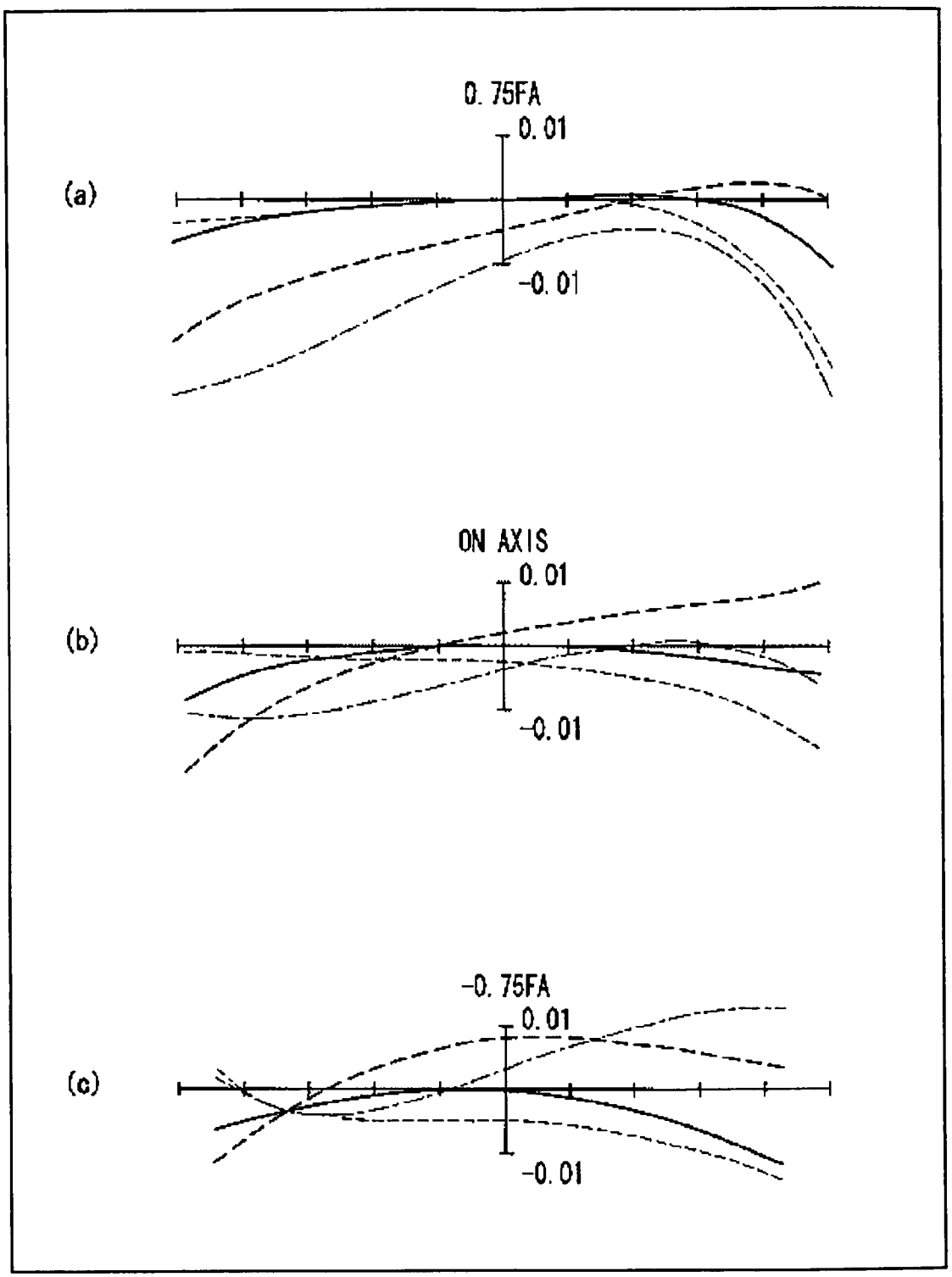
FIG. 10 is a lateral aberration diagram at the time of blur compensation at a telephoto limit of a zoom lens system of Example 2.
Figure 14:
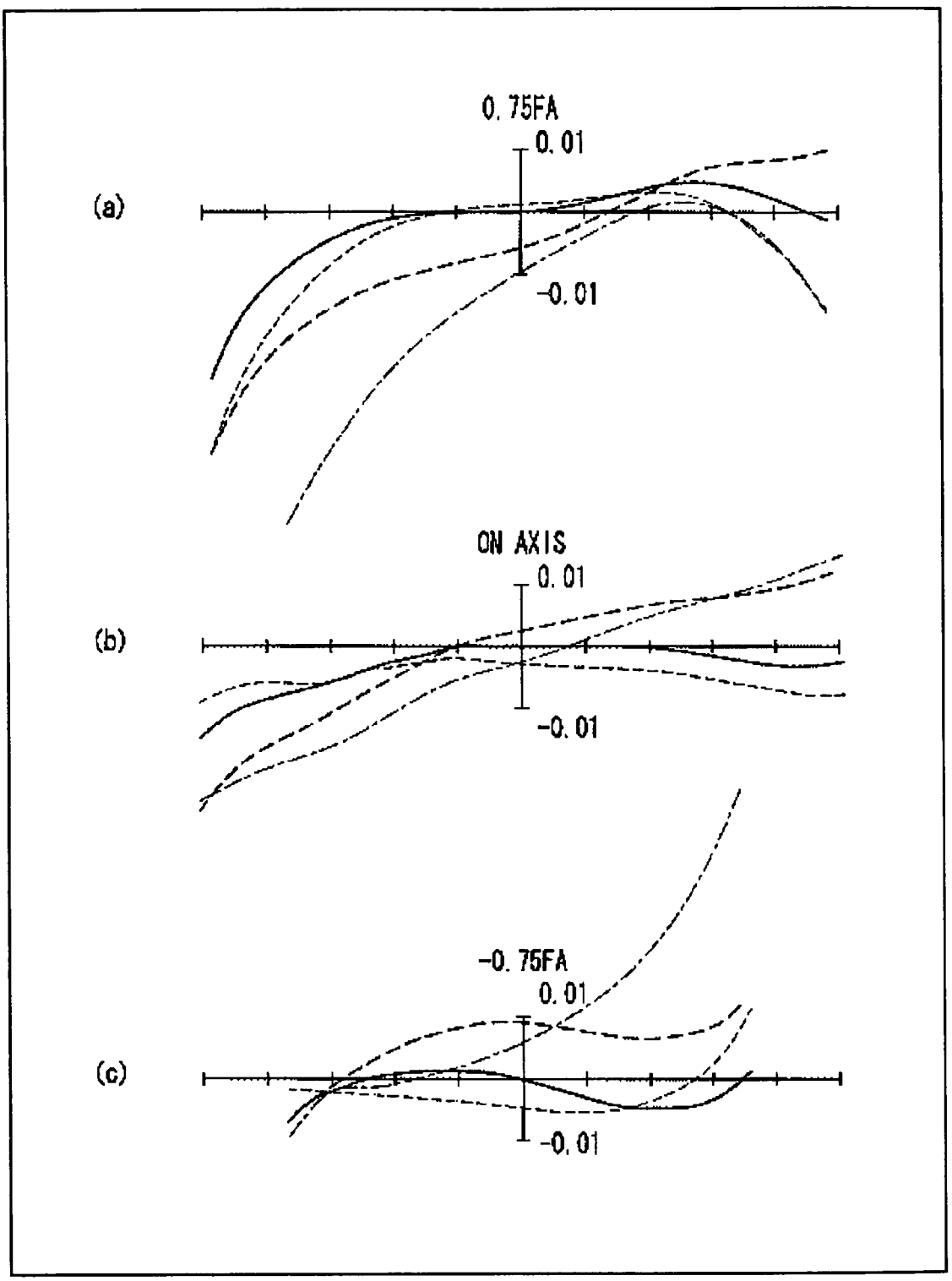
FIG. 14 is a lateral aberration diagram at the time of blur compensation at a telephoto limit of a zoom lens system of Example 3.
Figure 18:
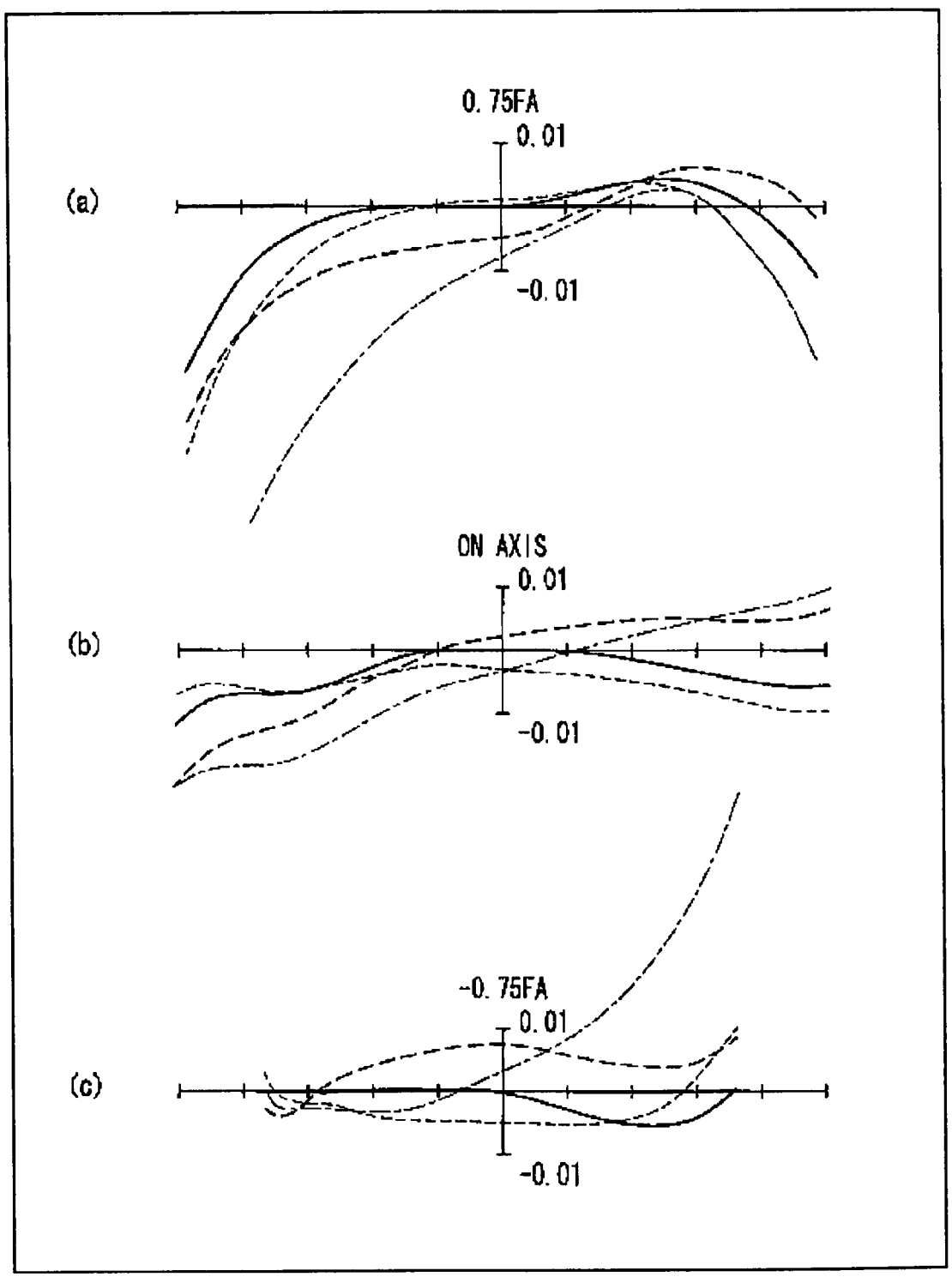
FIG. 18 is a lateral aberration diagram at the time of blur compensation at a telephoto limit of a zoom lens system of Example 4.
Figure 23:
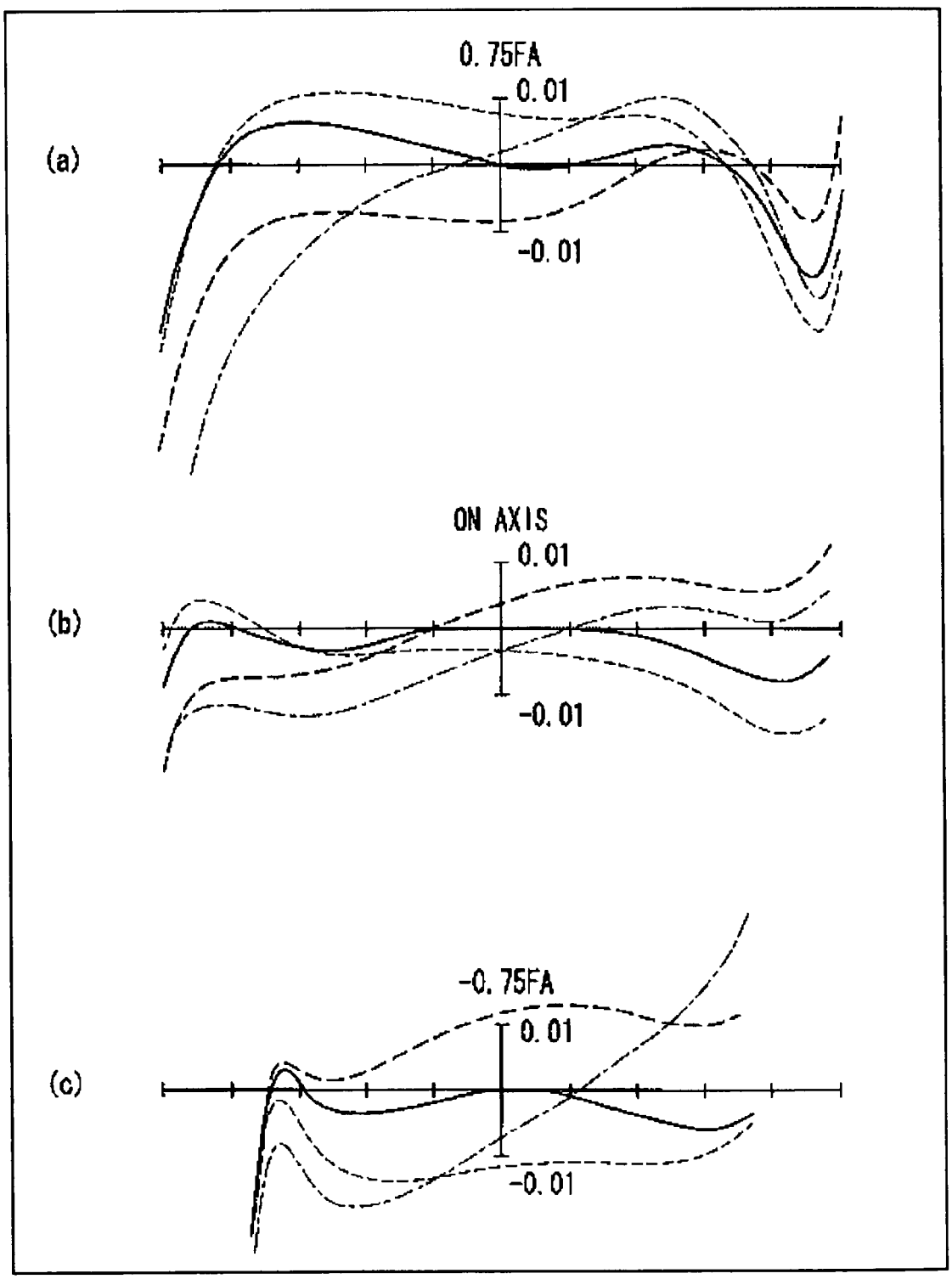
FIG. 23 is a lateral aberration diagram at the time of blur compensation at a telephoto limit of a zoom lens system of Example 5.
Figure 29:
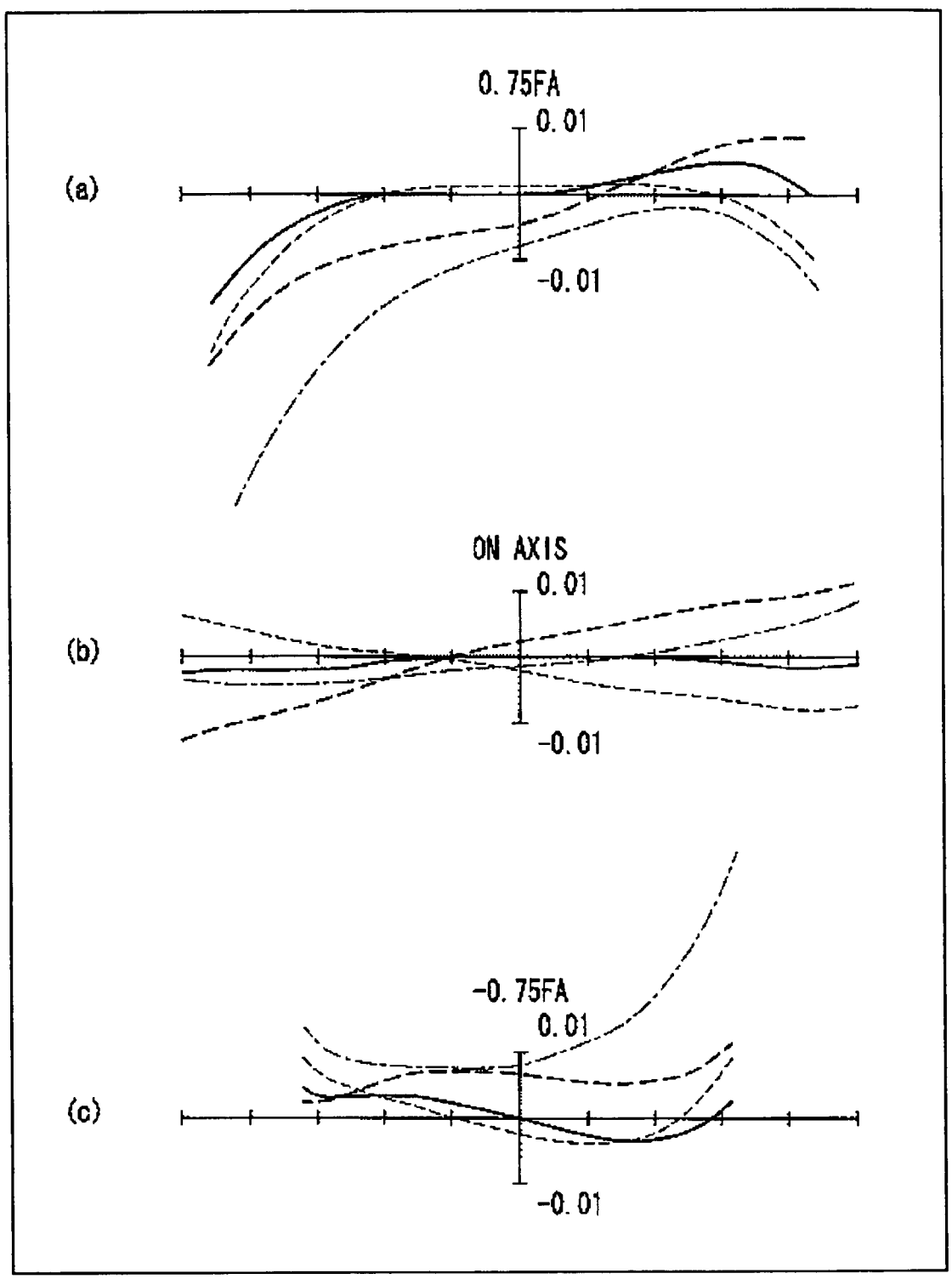
FIG. 29 is a lateral aberration diagram at the time of blur compensation at a telephoto limit of a zoom lens system of Example 6.
Figure 33:
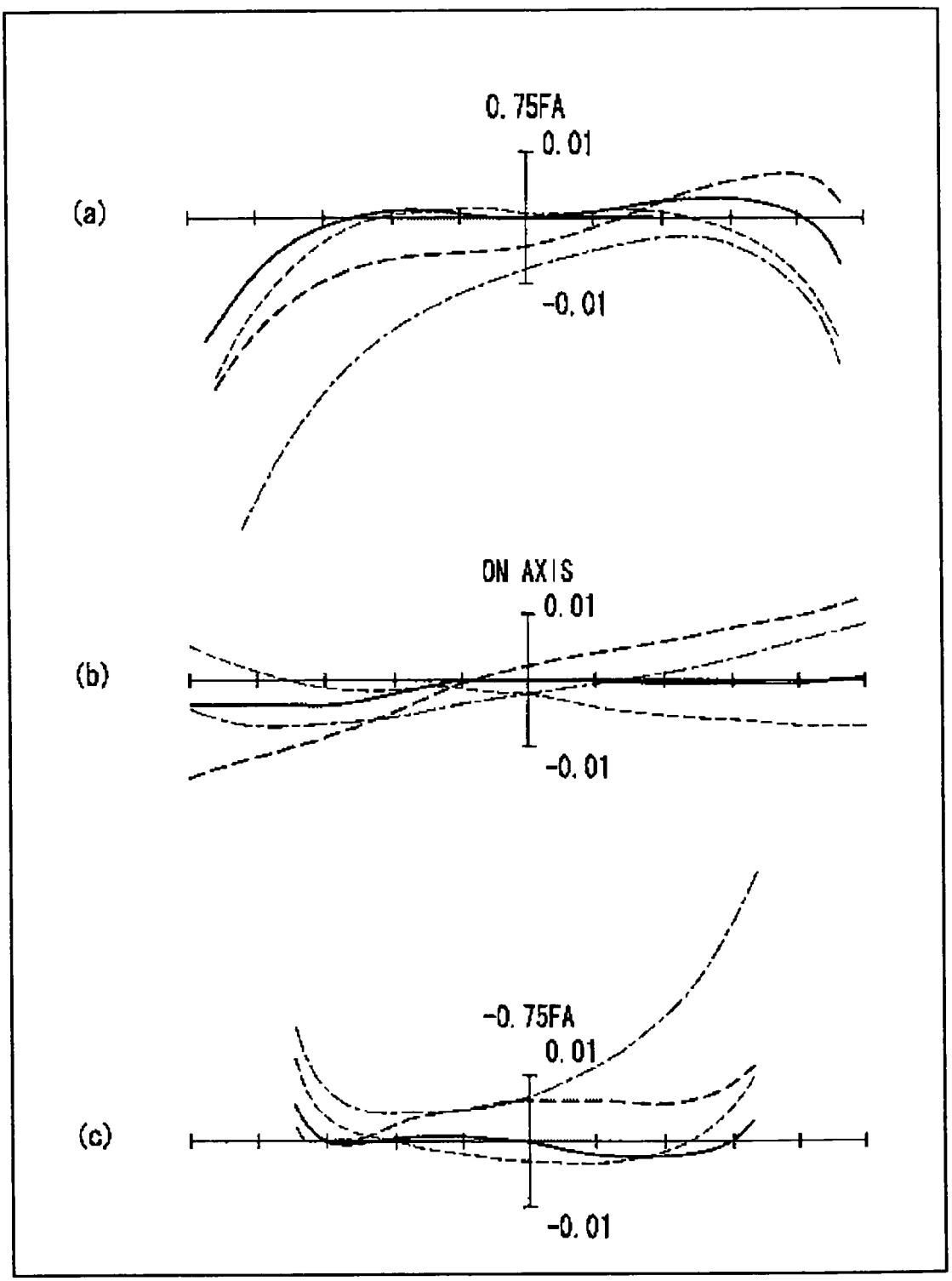
FIG. 33 is a lateral aberration diagram at the time of blur compensation at a telephoto limit of a zoom lens system of Example 7.

FIG. 6 is a lateral aberration diagram showing the aberration performance of the zoom lens system of Example 1 at the time of blur compensation of 0.35° at a telephoto limit. FIG. 10 is a lateral aberration diagram showing the aberration performance of the zoom lens system of Example 2 at the time of blur compensation of 0.30° at a telephoto limit. FIG. 14 is a lateral aberration diagram showing the aberration performance of the zoom lens system of Example 3 at the time of blur compensation of 0.33° at a telephoto limit. FIG. 18 is a lateral aberration diagram showing the aberration performance of the zoom lens system of Example 4 at the time of blur compensation of 0.33° at a telephoto limit. FIG. 23 is a lateral aberration diagram showing the aberration performance of the zoom lens system of Example 5 at the time of blur compensation of 0.47° at a telephoto limit. FIG. 29 is a lateral aberration diagram showing the aberration performance of the zoom lens system of Example 6 at the time of blur compensation of 0.47° at a telephoto limit. FIG. 33 is a lateral aberration diagram showing the aberration performance of the zoom lens system of Example 7 at the time of blur compensation of 0.33° at a telephoto limit.

In each lateral aberration diagram, part (a) is a lateral aberration diagram at a relative image height of 0.75. Part (b) is a lateral aberration diagram for the image center. Part (c) is a lateral aberration diagram at a relative image height of −0.75. Further, in each lateral aberration diagram, the solid line indicates the characteristics to the d-line, while the short dashed line indicates the characteristics to the F-line, while the long dashed line indicates the characteristics to the C-line, and while the dash-dotted line indicates the characteristics to the g-line.

As seen from the aberration performance diagrams of FIGS. 6, 10, 14, 18, 23, 29 and 33, the zoom lens system of Examples 1 to 7 has satisfactory aberration performance even at the time of blur compensation.

INDUSTRIAL APPLICABILITY

The zoom lens system according to the present invention is applicable to a camera such as a digital video camera, a digital still camera, a mobile telephone, a PDA (Personal Digital Assistance), a surveillance camera in a surveillance system, a Web camera or a vehicle-mounted camera. In particular, the zoom lens system is preferable to a camera such as a digital video camera or a digital still camera that requires high image quality, a large aperture and a small size and simultaneously requires blur compensation of the image.

The invention claimed is:

1. A zoom lens system, in order from an object side to an image side, comprising:
a first lens unit having positive optical power;
a second lens unit having negative optical power;
a third lens unit having positive optical power; and
a fourth lens unit having positive optical power, wherein:
the second lens unit includes a cemented lens element,
variable magnification is achieved by moving at least three lens units in an optical axis direction,
focusing is achieved by moving the fourth lens unit in the optical axis direction,
blur of an image is compensated by moving the third lens unit in a direction perpendicular to the optical axis, and
at least one of the following conditions (1) and (2) is satisfied:

$$0<(|\Delta L|\cdot f_W)/(f_T\cdot IM)<10\times10^{-2} \quad (1)$$

$$0.005<(|\Delta L3|\cdot f_W)/(f_T\cdot IM)<0.15 \quad (2)$$

(here, $Z=f_T/f_W>8.0$)
where,
$\Delta L$ is an amount of change in the overall optical length,
$\Delta L3$ is a difference between an interval from an image surface to a most object side surface of the third lens unit at a wide-angle limit and an interval from the image surface to the most object side surface of the third lens unit at a telephoto limit,
IM is an image size,
$f_W$ is a focal length of the entire system at a wide-angle limit, and
$f_T$ is a focal length of the entire system at a telephoto limit.

2. The zoom lens system as claimed in claim 1, wherein in magnification variation from a wide-angle limit to a telephoto limit, the first lens unit moves to the object side.

3. The zoom lens system as claimed in claim 1, wherein the third lens unit is located on the most image side at a wide-angle limit.

4. The zoom lens system as claimed in claim 1, satisfying the following condition (3):

$$-1.0<(\phi1+\phi2+\phi3+\phi4)/IM<3.5\times10^{-3} \quad (3)$$

(here, $Z=f_T/f_W>8.0$)
where,
$\phi1$ is optical power of the first lens unit,
$\phi2$ is optical power of the second lens unit,
$\phi3$ is optical power of the third lens unit,
$\phi4$ is optical power of the fourth lens unit, and
IM is an image size.

5. The zoom lens system as claimed in claim 1, wherein the third lens unit, in order from the object side to the image side, comprises a positive lens element, a positive lens element and a negative lens element.

6. The zoom lens system as claimed in claim 1, wherein the third lens unit, in order from the object side to the image side, comprises a positive lens element, a negative lens element and a positive lens element.

7. An imaging device capable of converting an optical image of a photographic object into an electric image signal and then outputting the signal, the imaging device comprising:
a zoom lens system that forms with a variable magnification the optical image of the photographic object; and
an image sensor that converts the optical image formed by the zoom lens system into the electric image signal, wherein
the zoom lens system, in order from the object side to the image side, comprises:
a first lens unit having positive optical power;
a second lens unit having negative optical power;
a third lens unit having positive optical power; and
a fourth lens unit having positive optical power, and wherein:
the second lens unit includes a cemented lens element,
variable magnification is achieved by moving at least three lens units in an optical axis direction,
focusing is achieved by moving the fourth lens unit in the optical axis direction,
blur of the image is compensated by moving the third lens unit in a direction perpendicular to the optical axis, and
at least one of the following conditions (1) and (2) is satisfied:

$$0<(|\Delta L|\cdot f_W)/(f_T\cdot IM)<10\times10^{-2} \quad (1)$$

$$0.005<(|\Delta L3|\cdot f_W)/(f_T\cdot IM)<0.15 \quad (2)$$

(here, $Z=f_T/f_W>8.0$)
at least one of the following conditions (1) and (2) is satisfied:
where,
$\Delta L$ is an amount of change in the overall optical length,
$\Delta L3$ is a difference between an interval from an image surface to a most object side surface of the third lens unit at a wide-angle limit and an interval from the image surface to the most object side surface of the third lens unit at a telephoto limit,
IM is an image size,
$f_W$ is a focal length of the entire system at a wide-angle limit, and
$f_T$ is a focal length of the entire system at a telephoto limit.

8. A camera capable of shooting a photographic object and then outputting its image as an electric image signal, the camera comprising
an imaging device having a zoom lens system that forms with a variable magnification the optical image of the photographic object and an image sensor that converts the optical image of the photographic object formed by the zoom lens system into the electric image signal, wherein
the zoom lens system, in order from the object side to the image side, comprises:
a first lens unit having positive optical power;
a second lens unit having negative optical power;
a third lens unit having positive optical power; and
a fourth lens unit having positive optical power, and wherein:
the second lens unit includes a cemented lens element,
variable magnification is achieved by moving at least three lens units in an optical axis direction,
focusing is achieved by moving the fourth lens unit in the optical axis direction, blur of the image is compensated by moving the third lens unit in a direction perpendicular to the optical axis, and at least one of the following conditions (1) and (2) is satisfied:

$$0 < (|\Delta L| \cdot f_W)/(f_T \cdot IM) < 10 \times 10^{-2} \quad (1)$$

$$0.005 < (|\Delta L3| \cdot f_W)/(f_T \cdot IM) < 0.15 \quad (2)$$

(here, $Z = f_T/f_W > 8.0$)

where, $\Delta L$ is an amount of change in the overall optical length, $\Delta L3$ is a difference between an interval from an image surface to a most object side surface of the third lens unit at a wide-angle limit and an interval from the image surface to the most object side surface of the third lens unit at a telephoto limit, IM is an image size, $f_W$ is a focal length of the entire system at a wide-angle limit, and $f_T$ is a focal length of the entire system at a telephoto limit.

9. The camera as claimed in claim 8, wherein the camera is a digital video camera capable of acquiring a moving image of a photographic object.

10. The camera as claimed in claim 8, wherein the camera is a digital still camera capable of acquiring a static image of a photographic object.

* * * * *